US009491464B2

(12) United States Patent
Carmel et al.

(10) Patent No.: US 9,491,464 B2
(45) Date of Patent: Nov. 8, 2016

(54) CONTROLLING A VIDEO CONTENT SYSTEM BY COMPUTING A FRAME QUALITY SCORE

(75) Inventors: Sharon Carmel, Ramat Hasharon (IL); Dror Gill, Haifa (IL); Tamar Shoham, Netanya (IL); Amir Leibman, Netanya (IL)

(73) Assignee: BEAMR IMAGING LTD, Tel-Aviv (IL)

(*) Notice: Subject to any disclaimer, the term of this patent is extended or adjusted under 35 U.S.C. 154(b) by 344 days.

(21) Appl. No.: 14/342,209

(22) PCT Filed: Aug. 28, 2012

(86) PCT No.: PCT/IL2012/050331
§ 371 (c)(1),
(2), (4) Date: Feb. 28, 2014

(87) PCT Pub. No.: WO2013/030833
PCT Pub. Date: Mar. 7, 2013

(65) Prior Publication Data
US 2014/0211859 A1 Jul. 31, 2014

Related U.S. Application Data

(60) Provisional application No. 61/528,361, filed on Aug. 29, 2011.

(51) Int. Cl.
*H04N 7/12* (2006.01)
*H04N 19/85* (2014.01)
(Continued)

(52) U.S. Cl.
CPC ...... *H04N 19/00903* (2013.01); *H04N 19/124* (2014.11); *H04N 19/154* (2014.11);
(Continued)

(58) Field of Classification Search
CPC .................. H04N 19/154; H04N 19/192
See application file for complete search history.

(56) References Cited

U.S. PATENT DOCUMENTS 5,583,888 A 12/1996 Ono
5,726,711 A 3/1998 Boyce
(Continued)

FOREIGN PATENT DOCUMENTS

EP 2343899 A1 7/2011
JP H09307930 A 11/1997
(Continued)

OTHER PUBLICATIONS

International Search Report and Written Opinion dated Dec. 11, 2012, from the corresponding PCT/IL12/50331.
(Continued)

*Primary Examiner* — Young Lee
(74) *Attorney, Agent, or Firm* — Browdy and Neimark, PLLC

(57) ABSTRACT

According to examples of the presently disclosed subject matter, a method of controlling a video content system can include: obtaining a current input frame and a preceding input frame from an input video sequence and obtaining a current degraded frame and a preceding degraded frame from a degraded video sequence corresponding to the input video sequence; computing a first differences value from the current input and the preceding input frames and a second differences value from the current degraded frame and the preceding degraded frame, comparing the first and second differences values, giving rise to an inter-frame quality score; computing an intra-frame quality score using an intra-frame quality measure that is applied in the pixel-domain of the current degraded frame and the current input frame and providing a configuration instruction to the video content system based on a quality criterion related to the inter-frame and the intra-frame quality scores.

39 Claims, 9 Drawing Sheets

(51) Int. Cl.

| | | |
|---|---|---|
| H04N 19/196 | (2014.01) | |
| H04N 19/172 | (2014.01) | |
| H04N 19/154 | (2014.01) | |
| H04N 19/192 | (2014.01) | |
| H04N 19/124 | (2014.01) | |
| H04N 19/86  | (2014.01) | |

(52) U.S. Cl.
CPC .......... *H04N19/172* (2014.11); *H04N 19/192* (2014.11); *H04N 19/197* (2014.11); *H04N 19/85* (2014.11); *H04N 19/86* (2014.11)

(56) References Cited

U.S. PATENT DOCUMENTS

| | | |
|---|---|---|
| 6,008,847 A | 12/1999 | Bauchspies |
| 6,125,144 A | 9/2000 | Matsumura et al. |
| 6,125,147 A | 9/2000 | Florencio et al. |
| 6,239,834 B1 | 5/2001 | Miyaji et al. |
| 6,442,207 B1 | 8/2002 | Nishikawa et al. |
| 6,683,988 B1 | 1/2004 | Fukunaga et al. |
| 6,856,650 B1 | 2/2005 | Takishima et al. |
| 7,161,982 B2 | 1/2007 | Kimoto |
| 7,623,719 B2 | 11/2009 | Molino et al. |
| 7,668,397 B2 | 2/2010 | Le Dinh et al. |
| 7,812,857 B2 | 10/2010 | Bourret |
| 7,903,736 B2 | 3/2011 | Kim et al. |
| 7,961,788 B2 | 6/2011 | Song |
| 8,755,613 B2 | 6/2014 | Yang et al. |
| 2005/0117640 A1 | 6/2005 | Han |
| 2005/0117647 A1 | 6/2005 | Han |
| 2006/0274618 A1 | 12/2006 | Bourret |
| 2006/0285589 A1 | 12/2006 | Hannuksela |
| 2007/0002946 A1 | 1/2007 | Bouton et al. |
| 2007/0025441 A1 | 2/2007 | Ugur et al. |
| 2007/0064793 A1 | 3/2007 | Wang et al. |
| 2007/0064794 A1 | 3/2007 | Wang et al. |
| 2007/0116126 A1 | 5/2007 | Haskell et al. |
| 2007/0223582 A1 | 9/2007 | Borer |
| 2008/0133242 A1 | 6/2008 | Sung et al. |
| 2009/0010327 A1 | 1/2009 | Cheng et al. |
| 2009/0103617 A1 | 4/2009 | Au et al. |
| 2010/0061461 A1 | 3/2010 | Bankoski et al. |
| 2010/0284464 A1 | 11/2010 | Nagori et al. |
| 2010/0315557 A1 | 12/2010 | Mathew et al. |
| 2011/0007968 A1 | 1/2011 | Yamada |
| 2011/0052084 A1 | 3/2011 | Yang et al. |
| 2011/0085605 A1 | 4/2011 | Xie et al. |
| 2014/0022460 A1 | 1/2014 | Li et al. |

FOREIGN PATENT DOCUMENTS

| | | |
|---|---|---|
| JP | 2005136810 | 5/2005 |
| JP | 2008028707 A | 2/2008 |
| JP | 2008533937 A | 8/2008 |
| JP | 2009094646 A | 4/2009 |
| JP | 2010124104 A | 6/2010 |
| JP | 2011510560 A | 3/2011 |
| WO | 2009091503 A1 | 7/2009 |
| WO | 2011031692 A2 | 3/2011 |
| WO | 2011042898 A1 | 4/2011 |

OTHER PUBLICATIONS

Yuen, Michael et al"A survey of hybrid MC/DPCM/DCT video coding distortions." Signal processing 70.3: 247-278 (Jul. 1998).

Yang, Jie Xiang et al "Video quality metric for temporal fluctuation measurement." Visual Communications and Image Processing 2010. International Society for Optics and Photonics, (2010).

Tan, Kwee et al "A multi-metric objective picture-quality measurement model for MPEG video." Circuits and Systems for Video Technology, IEEE Transactions on 10.7: 1208-1213. (2000).

Fan, Xiaopeng et al. "Flicking reduction in all intra frame coding." Joint Video Team of ISO/IEC MPEG and ITU-T VCEG, JVT-E070 (Oct. 2002).

Pinson, Margaret H. et al "A new standardized method for objectively measuring video quality." Broadcasting, IEEE Transactions on 50.3 : 312-322.(Sep. 2004).

Yang, Chunting et al "Objective Quality Metric Based on Spatial-temporal Distortion." MultiMedia and Information Technology, 2008. MMIT'08. International Conference on. IEEE, (2008).

ITU-T Recommendation J.247, "Objective perceptual multimedia video quality measurement in the presence of a full reference", ITU-T, Aug. 2008.

J. Hu, S. Choudhury and J.D. Gibson, "PSNRrJ-MOSr: An Easy-To-Compute Multiuser Perceptual Video Quality Measure", International Workshop on Quality of Multimedia Experience (QoMEx), Jul. 2009, pp. 116-120.

P. V. Pahalawatta and A. M. Tourapis, "Motion Estimated Temporal Consistency Metrics for Objective Video Quality Assessment", International Workshop on Quality of Multimedia Experience (QoMEx), Jul. 2009, pp. 174-179.

Z. Wang, A.C. Bovik, H.R. Sheikh, E.P. Simoncelli, "Image Quality Assessment: From Error Visibility to Structural Similarity", IEEE Transactions on Image Processing, vol. 13, No. 4, pp. 600-612, Apr. 2004.

F. N. Rahayu, U. Reiter, M.T.M. Nielsen, T. Ebrahimi, P. Svensson and A. Perkis, "Analysis of SSIM performance for digital cinema applications", International Workshop on Quality of Multimedia Experience (QoMEx), Jul. 2009, pp. 23-28.

K. Seshadrinathan, A.C. Bovik, "Motion Tuned Spatio-temporal Quality Assessment of Natural Videos", IEEE trans. Om image Processing, Feb. 2010, pp. 335-350.

J. Lubin and D. Fibush, "Sarnoff JND vision model", T1A1.5 Working group Document, T1 Standards Committee, 1997.

A.B. Watson, J. Hu and J.F. McGowan III, "Digital video quality metric based on human vision", Journal of Electronic imaging, vol. 10, No. I, Jan. 2001, pp. 20-29.

T. Richter, "On the mDCT-PSNR image quality index", International Workshop on Quality of Multimedia Experience (QoMEx), Jul. 2009, pp. 53-58.

C. Keimel, T. Oelbaum and K. Diepold, "Improving the verification process of video quality metrics", International Workshop on Quality of Multimedia Experience (QoMEx), Jul. 2009, pp. 121-126.

E.P. Ong, W. Lin, Z. Lu, S. Yao and M.H. Loke, "Perceptual Quality Metric for H.264 Low bit-rate videos", ICME 2006, pp. 677-680.

ITU-T H.264 | ISO/IEC 14496-10:2009, "Advanced video coding for generic audio-visual services", Mar. 2009.

T. Shoham, D. Gill and S. Carmel, "A novel perceptual image quality measure for block based image compression", IS&T/SP1E Electronic Imaging—Image Quality and System Performance VIII, Jan. 2011.

| $B_{1,16}$ | $B_{2,16}$ | . . . | $B_{16,16}$ |
| --- | --- | --- | --- |
| ⋮ | ⋮ | . . . | ⋮ |
| $B_{1,2}$ | $B_{2,2}$ | . . . | $B_{16,2}$ |
| $B_{1,1}$ | $B_{2,1}$ | . . . | $B_{16,1}$ |
|  |  |  |  |
| $A_{1,16}$ | $A_{2,16}$ | . . . | $A_{16,16}$ |
| ⋮ | ⋮ | . . . | ⋮ |
| $A_{1,2}$ | $A_{2,2}$ | . . . | $A_{16,2}$ |
| $A_{1,1}$ | $A_{2,1}$ | . . . | $A_{16,1}$ |

FIG. 6

| 0 | 1 | 2 |
|---|---|---|
| 3 | - | 4 |
| 5 | 6 | 7 |

FIG. 9A

| 23 | 24 | 124 |
|---|---|---|
| 22 | 123 | 125 |
| 120 | 128 | 130 |

FIG. 9B

| 100 | 99 | 1 |
|---|---|---|
| 101 | - | 2 |
| 3 | 5 | 7 |

FIG. 9C

CONTROLLING A VIDEO CONTENT SYSTEM BY COMPUTING A FRAME QUALITY SCORE

FIELD OF THE INVENTION

The present invention is in the field of video content system control and configuration.

SUMMARY OF THE INVENTION

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operation data can be used by a presently disclosed component(s). By way of example, such operational data can be stored on tangible computer readable medium. The operational data can be a single data set, or it can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

Examples of the presently disclosed subject matter relate to a method and a device for controlling a video content system based on an input video sequence and a corresponding degraded video sequence. The input video sequence can include at least a current input frame and a preceding input frame, and the degraded video sequence can include at least a current degraded frame and a preceding degraded frame. The method of controlling a video content system based on an input video sequence and a corresponding degraded video sequence can include: obtaining the current input frame, the preceding input frame, the current degraded frame and the preceding degraded frame; computing a first differences value from the current input and the preceding input frames and a second differences value from the current degraded frame and the preceding degraded frame; comparing the first and second differences values giving rise to an inter-frame quality score; computing an intra-frame quality score using an intra-frame quality measure that can be applied in the pixel-domain of the current degraded frame and the current input frame; and providing a configuration instruction to the video content system based on a quality criterion related to the inter-frame and the intra-frame quality scores.

According to examples of the presently disclosed subject matter, the degraded video sequence can be a compressed video sequence corresponding to the input video sequence, and the method can include: providing a compression parameter value, and wherein: obtaining includes, obtaining a candidate compressed frame generated from a current input frame according to the compression parameter value and for each current input frame and candidate compressed frame providing a stored compressed frame corresponding to the preceding input frame, and wherein computing a first differences value includes computing a first differences value from the current input and the preceding input frames, and wherein computing a second differences value includes computing a second differences value from the candidate compressed frame and the stored compressed frame, and comparing the first and second differences values giving rise to an inter-frame quality score, and wherein computing an intra-frame quality score includes computing an intra-frame quality using an intra-frame quality measure that can be applied in the pixel-domain of the candidate compressed frame and the current input frame, and wherein in case a quality criterion related to inter-frame and intra-frame quality is not satisfied, instructing the video encoder to repeat a compression process using an updated compression parameter value, giving rise to an updated candidate compressed frame and computing the inter-frame quality score and the intra-frame quality score based on the updated candidate compressed frame.

According to examples of the presently disclosed subject matter, the method can further include computing a frame quality score for the current candidate compressed frame based on the intra-frame and the inter-frame quality scores, and wherein the quality criterion can be related to the frame quality score.

According to examples of the presently disclosed subject matter, the method can further include partitioning each of the current input frame, the preceding input frame, the candidate compressed frame and the stored compressed frame into corresponding tiles; calculating an intra-tile and an inter-tile quality scores for each set of corresponding tiles; computing perceptually driven weights for the intra-tile and the inter-tile quality scores; and pooling the tile scores giving rise to the frame quality score.

According to examples of the presently disclosed subject matter, computing an intra-frame quality score can further include using a full-reference pixel-domain quality measure, wherein the input frame can be the pixel domain reference.

According to examples of the presently disclosed subject matter, computing an intra-frame quality score can include computing an intra-frame quality score based on a pixel-wise difference between the input frame and the candidate compressed frame.

According to examples of the presently disclosed subject matter, computing an intra-frame quality score can further include normalizing the intra-frame quality score based on a brightness parameter value of pixels in either the candidate compressed frame or the input frame.

According to examples of the presently disclosed subject matter, computing an intra-frame quality score can further include: partitioning a current input frame tile and a corresponding candidate compressed frame tile, giving rise to a plurality of sub-tile pairs; computing an intra sub-tile quality score for each one of the plurality of sub-tile pairs; computing a perceptually driven weight for each one of the plurality of sub-tile pairs giving rise to a plurality of weighted intra sub-tile quality scores; and pooling the plurality of weighted intra sub-tile quality scores into a corresponding plurality of intra-tile quality scores.

According to examples of the presently disclosed subject matter, computing an inter-frame quality score can include: partitioning each tile from a set of corresponding tiles consisting of: a current input frame tile, a preceding frame tile, a candidate compressed frame tile and a stored compressed frame tile into two or more sub-tiles, giving rise to two or more sub-tile groups; computing an inter sub-tile score for each of the two or more sub-tile groups; and pooling the two or more inter sub-tile scores into a corresponding inter-frame tile quality score.

According to examples of the presently disclosed subject matter, computing an intra-frame quality score can include, calculating an added artifactual edges score that can be based on quantifying an extent of added artifactual edges along a video coding block boundary of the candidate compressed frame relative to the current input frame, wherein the extent of added artifactual edges can be determined according to a behavior of pixel values across video coding block boundaries in relation to a behavior of pixel values on either side of respective video coding block boundaries.

According to examples of the presently disclosed subject matter, calculating an added artifactual edges score further can include, normalizing the added artifactual edges score according to an artifactual edges normalization factor that can be based on the brightness parameter value and on a distribution of the extent of added artifactual edges.

According to examples of the presently disclosed subject matter, computing an intra-frame quality score further can include, calculating a texture distortion score based on relations between texture values in the current input frame and in the corresponding candidate compressed frame, each texture value corresponding to a variance of pixel values within each one of a plurality of predefined pixel groups in the current input frame and in each respective pixel group in the corresponding candidate compressed frame.

According to examples of the presently disclosed subject matter calculating a texture distortion score can include applying one or more texture distortion sensitivity thresholds to the relations between texture values in the current input frame and in the corresponding candidate compressed frame, giving rise to a non-linear texture distortion score mapping that can be based on the texture distortion sensitivity thresholds.

According to examples of the presently disclosed subject matter, applying one or more texture distortion sensitivity thresholds can include adapting the one or more texture distortion sensitivity thresholds according to the calculated pixel-wise differences.

According examples of the presently disclosed subject matter, calculating a texture distortion score can further include, normalizing the texture distortion score according to the brightness parameter value and according to the artifactual edges normalization factor.

According to examples of the presently disclosed subject matter, computing an intra-frame quality score can further include: obtaining an edge map corresponding to the current input frame; for each edge pixel in the current input frame providing an edge strength score based on a deviation between a value of an edge pixel and one or more pixels in the proximity of the edge pixel; for each corresponding pixel in the candidate compressed frame providing an edge strength score based on a deviation between a value of the corresponding pixel and one or more pixels in the proximity of the corresponding pixel; and calculating an edge loss score based on a relation among the edge strength score of the edge pixel and the edge strength score of the corresponding pixel.

According to examples of the presently disclosed subject matter, computing an intra-frame quality score can include: obtaining an edge map corresponding to the current input frame; obtaining an edge map corresponding to the candidate compressed frame; and calculating an edge loss score based on a loss of edge pixels according to a difference between the edge map corresponding to the current input frame and the edge map corresponding to the candidate compressed frame.

According to examples of the presently disclosed subject matter, computing an intra-frame quality score can include factoring the intra-frame quality score based on a spatial distribution of pixel domain differences among the current input frame and the candidate compressed frame.

According to examples of the presently disclosed subject matter, computing an intra-frame quality score can includes: for each candidate compressed frame tile, computing a tile spatial distribution score based on a distribution among the pixel difference scores of the corresponding sub-tile pairs; for the candidate compressed frame, pooling the tile spatial distribution scores, giving rise to a frame spatial distribution score; and factoring the intra-frame quality score according to the frame spatial distribution score.

According to examples of the presently disclosed subject matter, providing a configuration instruction can include providing a configuration parameter that can be related to a respective operation or asset of the video content system.

According to examples of the presently disclosed subject matter, providing a configuration instruction can include providing an indication with regard to an extent of modification that is to be applied to the configuration of a respective operation or asset of the video content system.

According to a further aspect of the currently disclosed subject matter, there is provided a device for controlling a video content system based on an input video sequence and a corresponding degraded video sequence. The input video sequence including at least a current input frame and a preceding input frame, and the degraded video sequence including at least a current degraded frame and a preceding degraded frame. According to examples of the presently disclosed subject matter, the device for controlling a video content system based on an input video sequence and a corresponding degraded video sequence can include: an interface configured to receive as input each of the current input frame, the preceding input frame, the current degraded frame and the preceding degraded frame; a processor configured to compute a first differences value from the current input frame and the preceding input frame, and a second differences value from the current degraded frame and the preceding degraded frame; a quality degradation evaluation module adapted to compare the first and the second differences values, giving rise to an inter-frame quality score; the compression quality evaluation module can be adapted to compute an intra-frame quality score using an intra-frame quality measure that can be applied in the pixel-domain of the current input frame and the current degraded frame; and a video content system configurator, configured to provide a configuration instruction to the video content system based on a quality criterion related to the inter-frame and the intra-frame quality scores.

According to examples of the presently disclosed subject matter, the degraded video sequence can be a compressed video sequence corresponding to the input video sequence, and the device can include: a buffer adapted to hold a preceding input frame and a preceding compressed frame corresponding to the preceding input frame, and wherein: the video content system configurator can be adapted to instruct a video encoder to compress the current input frame according to a compression parameter value, giving rise to a candidate compressed frame; the interface can be adapted to receive the current input frame and the candidate compressed frame, the processor can be configured to compute a first differences value from the current input frame and preceding input frame, and a second differences value from the candidate compressed frame and the preceding compressed frame, the quality degradation evaluation module can be adapted to compute an intra-frame quality score using an intra-frame quality measure that can be applied in the pixel-domain for the candidate compressed frame and the current input frame, and the quality degradation evaluation module can be adapted to compare the first and second differences values giving rise to an inter-frame quality score, wherein in case a quality criterion related to inter-frame and intra-frame quality scores is not satisfied, the a video content system configurator can be adapted to instruct the video encoder to repeat the video compression of the current input frame using an updated compression parameter value, giving rise to an updated candidate compressed frame and computing the inter-frame quality score and the intra-frame quality score based on the updated candidate compressed frame.

According to examples of the presently disclosed subject matter, the processor can be further adapted to compute a frame quality score for the current input frame based on the intra-frame and the inter-frame quality scores, and wherein the quality criterion can be related to the frame quality score.

According to examples of the presently disclosed subject matter, the device can include a frame partitioning module adapted to partition each of the current input frame, the preceding input frame, the candidate compressed frame and the stored compressed frame into two or more tiles, and wherein the processor can be adapted to: calculate an intra-tile and an inter-frame quality score for each set of corresponding tiles; compute perceptually driven weights for the intra-tile and the inter-tile quality scores; and pool tile scores, giving rise to the frame quality score.

According to examples of the presently disclosed subject matter, the quality degradation evaluation module can be adapted to use a full-reference pixel-domain quality measure to compute the intra-frame quality score, wherein the input frame can be a pixel domain reference.

According to examples of the presently disclosed subject matter, the quality degradation evaluation module can be adapted to compute the intra-frame quality score based on a pixel-wise difference between the input frame and the candidate compressed frame.

According to examples of the presently disclosed subject matter, the quality degradation evaluation module can be adapted to normalize the intra-frame quality score based on a brightness parameter value of pixels in either the candidate compressed frame or the input frame.

According to examples of the presently disclosed subject matter, the device can include a partitioning module that can be adapted to partition a current input frame tile and a corresponding candidate compressed frame tile, giving rise to a plurality of sub-tile pairs, and wherein the quality degradation evaluation module can be adapted to: compute an intra sub-tile quality score for each one of the plurality of sub-tile pairs; compute a perceptually driven weight for each one of the plurality of sub-tile pairs giving rise to a plurality of weighted intra sub-tile quality scores; and pool the plurality of weighted intra sub-tile quality scores into a corresponding plurality of intra-tile quality scores.

According to examples of the presently disclosed subject matter, the device can further include a partitioning module that can be adapted to partition each tile from a set of corresponding tiles consisting of: a current input frame tile, a preceding input frame tile, a candidate compressed frame tile and a stored compressed frame tile into two or more sub-tiles, giving rise to two or more sub-tile sets, and wherein, the quality degradation evaluation module can be adapted to: compute an inter sub-tile score for each of the two or more sub-tile sets; and pool the two or more inter sub-tile scores into a corresponding inter-frame tile quality score.

According to examples of the presently disclosed subject matter, the quality degradation evaluation module can be adapted to calculate an added artifactual edges score that can be based on quantifying an extent of added artifactual edges along a video encoding coding block boundary of the candidate compressed frame relative to the current input frame, wherein the extent of added artifactual edges can be determined according to a behavior of pixel values across video coding block boundaries in relation to a behavior of pixel values on either side of respective video coding block boundaries, and wherein the intra-frame quality score can be associated with the calculated added artifactual edges score.

According to examples of the presently disclosed subject matter, the quality degradation evaluation module can be adapted to normalize the added artifactual edges score according to an artifactual edges normalization factor that can be based on the brightness parameter value and on a distribution of the extent of added artifactual edges.

According to examples of the presently disclosed subject matter, the quality degradation evaluation module can be adapted to compute a texture distortion score based on relations between texture values in the current input frame and in the corresponding candidate compressed frame, each texture value corresponding to a variance of pixel values within each one of a plurality of predefined pixel groups in the current input frame and in each respective pixel group in the corresponding candidate compressed frame, and wherein the intra-frame quality score can be associated with the calculated texture distortion score.

According to examples of the presently disclosed subject matter, the quality degradation evaluation module can be adapted to apply one or more texture distortion sensitivity thresholds to the relations between texture values in the current input frame and in the corresponding candidate compressed frame, giving rise to a non-linear texture distortion score mapping that can be based on the texture distortion sensitivity thresholds, and wherein the texture distortion score can be associated with the non-linear texture distortion score mapping.

According to examples of the presently disclosed subject matter, the quality degradation evaluation module can be adapted to adapt the one or more texture distortion sensitivity thresholds according to the calculated pixel-wise differences.

According to examples of the presently disclosed subject matter, the quality degradation evaluation module can be adapted to normalize the texture distortion score according to the brightness parameter value and according to the artifactual edges normalization factor.

According to examples of the presently disclosed subject matter, the quality degradation evaluation module can be adapted to: obtain an edge map corresponding to the current input frame; obtain an edge map corresponding to the candidate compressed frame; and calculate an edge loss score based on a loss of edge pixels according to a difference between the edge map corresponding to the current input frame and the edge map corresponding to the candidate compressed frame.

According to examples of the presently disclosed subject matter35, the quality degradation evaluation module can be adapted to factor the intra-frame quality score based on a spatial distribution of pixel domain differences among the current input frame and the candidate compressed frame.

According to examples of the presently disclosed subject matter, the quality degradation evaluation module can be adapted to: compute a tile spatial distribution score for each candidate compressed frame tile based on a distribution among the pixel difference scores of the corresponding sub-tile pairs; pool the tile spatial distribution scores for the candidate compressed frame, giving rise to a frame spatial distribution score; and factor the intra-frame quality score according to the frame spatial distribution score.

According to some examples of the presently disclosed subject matter20, the video content system configurator can be adapted to provide a configuration instruction which includes a configuration parameter that can be related to a respective operation or asset of the video content system.

According to examples of the presently disclosed subject matter, the configuration instruction indicates an extent of modification that is to be applied to the configuration of a respective operation or asset of the video content system.

According to a further aspect of the currently disclosed subject matter these is provided a program storage device readable by machine, tangibly embodying a program of instructions executable by the machine to perform a method of controlling a compression of a video frame from a video sequence to compress a video frame from an input video sequence. According to examples of the presently disclosed subject matter, the method can include: providing a compression parameter value; obtaining a candidate compressed frame generated from a current input frame according to the compression parameter value; for each current input frame and candidate compressed frame providing a stored compressed frame corresponding to the preceding input frame; computing a first differences value from the current input and the preceding input frames and a second differences value from the candidate compressed frame and the stored compressed frame; comparing the first and second differences value giving rise to an inter-frame quality score; computing an intra-frame quality score using an intra-frame quality measure that can be applied in the pixel-domain of the candidate compressed frame and the current input frame; and in case a quality criterion related to inter-frame and intra-frame quality is not satisfied, instructing the video encoder to repeat a compression process using an updated compression parameter value giving rise to an updated candidate compressed frame and computing the inter-frame quality score and the intra-frame quality score based on the updated candidate compressed frame.

According to yet another aspect of the invention according to the currently disclosed subject matter there is provided a computer program product comprising a computer useable medium having computer readable program code embodied therein for controlling a compression of a video frame from a video sequence to compress a video frame from an input video sequence. According to examples of the presently disclosed subject matter, the computer program product can include: computer readable program code for causing the computer to provide a compression parameter value; computer readable program code for causing the computer to obtain a candidate compressed frame generated from a current input frame according to the compression parameter value; computer readable program code for causing the computer to for each current input frame and candidate compressed frame providing a stored compressed frame corresponding to the preceding input frame; computer readable program code for causing the computer to compute a first differences value from the current input and the preceding input frames and a second differences value from the candidate compressed frame and the stored compressed frame; computer readable program code for causing the computer to compare the first and second differences value giving rise to an inter-frame quality score; computer readable program code for causing the computer to compute an intra-frame quality score using an intra-frame quality measure that can be applied in the pixel-domain of the candidate compressed frame and the current input frame; and computer readable program code for causing the computer to in case a quality criterion related to inter-frame and intra-frame quality is not satisfied, instructing the video encoder to repeat a compression process using an updated compression parameter value giving rise to an updated candidate compressed frame and computing the inter-frame quality score and the intra-frame quality score based on the updated candidate compressed frame.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 6 is a graphical illustration of the pixel values of two blocks sharing a common (vertical) block boundary;

FIG. 9A is an example of a schematic enumeration of the pixels surrounding the pixel at $\{i, j\}$;

FIG. 9B is a schematic illustration of the pixel values (edge pixel is bolded) of the pixels surrounding the pixel at $\{i, j\}$; and FIG. 9C is a schematic illustration of the absolute differences values (maximum value is bolded) computed for the pixels surrounding the pixel at $\{i, j\}$, and which demonstrates the case for a diagonal edge, where $ED_{org}(i, j)=3$.

Figure 1:
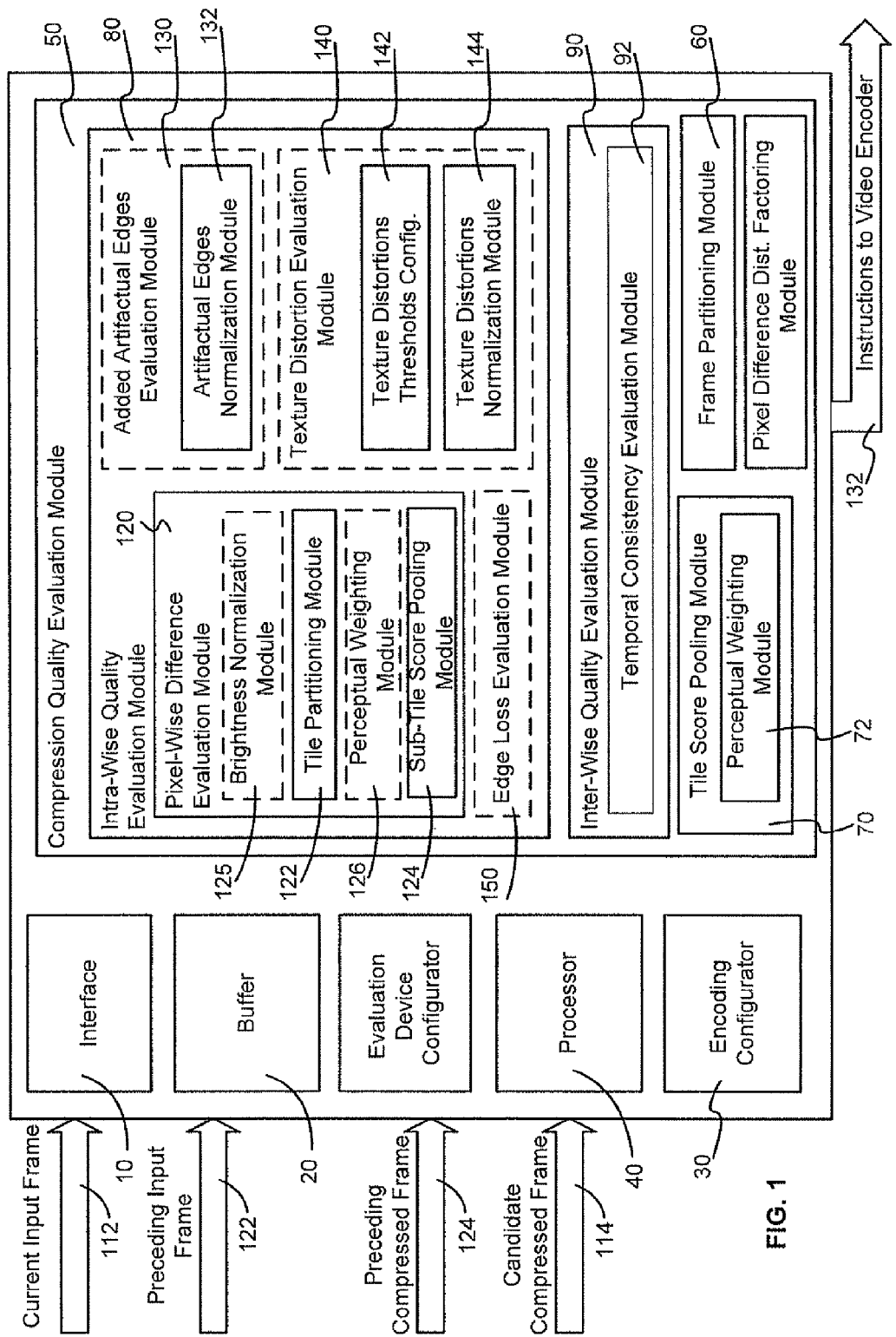
FIG. 1 is a block diagram illustration of a device for controlling a compression of a video frame from a video sequence, according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing device, or similar electronic computing device, that manipulate and/or transform data represented as physical, such as electronic, quantities within the computing device's registers and/or memories into other data similarly represented as physical quantities within the computing device's memories, registers or other such tangible information storage, transmission or display devices.

Provided below is a list of conventional terms in the field of image processing and in the field of digital video content systems and digital video processing. For each of the terms below a short definition is provided in accordance with each of the term's conventional meaning in the art. The terms provided below are known in the art and the following definitions are provided as a non-limiting example only for convenience purposes. Accordingly, the interpretation of the corresponding terms in the claims, unless stated otherwise, is not limited to the definitions below, and the terms used in the claims should be given their broadest reasonable interpretation.

Throughout the description of examples of the presently disclosed subject matter and in the claims, reference is made to the term "video content system" or "digital video content system". A video content system or a digital video content system is a system that is configured to send, receive, display or create one or more video sequences (or at least digital data which corresponds to a video sequence). In some examples of the presently disclosed subject matter, the video content system is configured to process an input video sequence. Examples of processing which can be carried out by the video content system include, but are not limited to, one or more of the following: encoding, compressing and recompressing. Still further by way of example, the video content system can modify various parameters of the processing of the video sequence, and the quality of the output (processed video sequence) can be influenced by the processing parameters that are used.

In further examples of the presently disclosed subject matter, either in addition or as an alternative to the processing by the video content system, the video content system can be configured to distribute one or more video sequences to one or more users. Still further by way of example, a limited amount of resources are allocated for the distribution of the video sequence by the video content system, and the video content system can cause the allocation of resources that are to be used for distributing the video sequence to be modified.

The video content system can receive as input RAW digital data, for example in the YUV domain, and can be configured to encode or compress the digital data, for example, the video content system can be a video compression system. Further by way of example, the video content system can receive as input an encoded or compressed video sequence and can be configured to decode and encode, or recompress, the encoded or compressed input video sequence. The video content system can be configured to apply various encoding or compression parameters as part of the encoding or compression process, and the level of quality degradation that is introduced through the encoding or compression process is related to the encoding or compression parameters.

The video content system can be configured to distribute the input video sequence. The video content system can be configured to process the video sequence to accommodate the video sequence according to the extent of resources that are allocated or that are available for the distribution of the video sequence. The processing by the video content system of the video sequence for distribution thereof can produce a degraded video sequence. The level of quality degradation introduced to the video sequence can be related to the extent of resources that are allocated for the distribution of the video sequence.

Throughout the description of examples of the presently disclosed subject matter and in the claims, reference is made to the term "video sequence". A video sequence is a sequence of video frames.

Throughout the description of examples of the presently disclosed subject matter and in the claims, reference is made to the term "degraded video sequence". A "degraded video sequence" is a video sequence that has undergone some processing or has gone through quality degradation for any other reason, including for example, transmission errors, which reduced its perceived visual quality relative to the video sequence before the processing.

Throughout the description of examples of the presently disclosed subject matter and in the claims, reference is made to the terms "video compression" and "video encoding" or in short "compression" and "encoding". Unless the text implies otherwise, the term "compression" as used herein can be interchanged with the more general term "encoding"

According to an aspect of the current disclosed subject matter, there is provided a system, and a method of controlling a video content system. According to examples of the presently disclosed subject matter, a device for controlling a video content system, can receive an input video sequence and a corresponding degraded video sequence. The input video sequence can include at least a current input frame and a preceding input frame. The degraded sequence can include at least a current degraded frame and a preceding degraded frame.

According to examples of the presently disclosed subject matter, the device for controlling a video content system can include: an interface, a processor, a quality degradation evaluation module and a video content system configurator.

The interface can be configured to receive as input each of the current input frame, the preceding input frame, the current degraded frame and the preceding degraded frame. The processor can be configured to compute a first differences value from the current input frame and the preceding input frame, and a second differences value from the current degraded frame and the preceding degraded frame. The quality degradation evaluation module can be adapted to compare the first and the second differences values, and to provide an inter-frame quality score based on the comparison. The quality degradation evaluation module can be adapted to compute an intra-frame quality score using an intra-frame quality measure that is applied in the pixel-domain of the current input frame and the current degraded frame. The video content system configurator can be configured to provide a configuration instruction to the video content system based on a quality criterion related to the inter-frame and the intra-frame quality scores.

Further aspects of the currently disclosed subject matter relate to a method of a video content system based on an input video sequence and a corresponding degraded video sequence. Yet further aspects of the presently disclosed subject matter relate to a program storage device readable by machine, tangibly embodying a program of instructions executable by the machine to perform the method of controlling a video content system based on an input video sequence and a corresponding degraded video sequence. Still further aspects of the presently disclosed subject matter, relate to a computer program product comprising a computer useable medium having computer readable program code embodied therein for controlling a video content system based on an input video sequence and a corresponding degraded video sequence.

According to examples of the presently disclosed subject matter, the control over the video content system is carried out according the quality of the degraded video sequence. The quality of the degraded video sequence is measured by a perceptual quality measure. Examples of perceptual quality measures which can be used for evaluating the quality of the degraded video sequence are disclosed herein. The degraded video sequence can be a candidate for output or distribution. The degraded video sequence can be buffered pending output or distribution, and the provisioning or distribution thereof can be contingent upon the quality criterion, evaluated by the device for controlling a video system, meeting the quality criterion implemented by the device. In a further example, certain aspects of the processing (e.g., encoding, compression, etc.) or of the distribution of the degraded video sequence by the video content system can be modified in-process according to and upon receiving results or instructions from the device for controlling the video content system.

As mentioned above, and as will be described further below, the quality scores computed and used to evaluate the quality of the degraded video sequence by the device for controlling a video content system, can be based on a relative quality of the degraded video sequence when compared to a reference video sequence. In this regard, it would be appreciated that according to examples of the presently disclosed subject matter, the device for controlling the video content system can receive as input a video sequence that is used as a reference video sequence for evaluating the quality of the degraded video sequence. Further by way of example, the input video sequence that is used as a reference video sequence is the video sequence (or data corresponding to a video sequence) prior to the processing by the video content system. In other words, the video sequence prior to processing by the video content system can be used a reference for evaluating the quality of the processed video sequence.

In other examples, the input video sequence which corresponds to the degraded video sequence is obtained from a source that is external to the video content system. For example, the video content system can store or deliver a degraded video sequence only, and the input (non-degraded) sequence may be provided in a separate file that is used as a reference to evaluate a degradation of the (input) video sequence in the separate reference file. The causes for the degradation can be varied and can include for example, encoding, bit-rate reduction, transmission errors etc. In this regard, in some examples of the presently disclosed subject matter, the input (non-degraded) sequence can be obtained for the purpose of the quality evaluation, and possibly for this purpose alone. It would be appreciated that in some examples of the presently disclosed subject matter, the input (non-degraded sequence) can be obtained from a different source than the degraded sequence (both the current degraded frame and the preceding degraded frame).

Further according to examples of the presently disclosed subject matter, the degraded video sequence can be a buffered video sequence that is a candidate output video sequence of the video content system. In this example, the candidate (degraded) output video sequence can be evaluated before it is provided as output. The candidate output video sequence can be replaced or additional processed and adjusted (one or more additional times) in case the candidate output video sequence does not meet the quality criterion implemented by the device for control the video content system.

In yet further examples of the presently disclosed subject matter, the degraded video sequence represents but is not identical to a video sequence that is to be provided as output of the video content system. For example, the video content system can distribute (e.g., communicate) a video stream, and the quality of the ongoing video stream can be sampled, and the sampled video frames can be used as the degraded video sequence in the quality evaluation process implemented by the device for controlling the video content system. In yet another example, the degraded video frames whose quality is evaluated by the device for controlling the video content system are not part of the same video sequence or video stream whose quality is influenced by the configuration modification that is implemented as a result of the quality evaluation.

Further by way of example, the evaluation process implemented by the device for control the video content system can take place in parallel with the distribution of the video sequence. Thus, for example, the quality of sampled video frames used as the degraded video sequence can be evaluated while the video stream distribution is ongoing. In case the degraded video sequence does not meet the quality criterion, the configuration of the video stream distribution or the encoding parameters of the video stream can be adjusted and the modified configuration can influence the distribution of the subsequent frames. In other words, the evaluation of the quality of the degraded video sequence can be carried out with respect to a first set of video frames which are part of a certain video sequence and the configuration of the video content system which is associated with the results of the quality evaluation by the device for controlling the video content system influences the quality of subsequent video frames of the video stream (the same or a different video stream as the degraded video frames).

According to examples of the presently disclosed subject matter, the input video sequence that is used by the device for controlling the video content system can provide a 1:1 (frame-to-frame) correspondence with the degraded video sequence, such that for each degraded video frame there is a corresponding input/reference video frame. According to further examples of the presently disclosed subject matter, the input video sequence is only partial compared to the degraded video sequence, or vice-versa, and some sampling scheme or correspondence scheme can be used to evaluate the quality of the degraded video sequence based on the partial input video sequence. In other examples, the degraded video sequence has a lower frame rate or frame count compared to the input video sequence and the correspondence between degraded video frames and input video frame is determined, for example, according to metadata embedded in the video frames, according to data describing the video sequence characteristics or parameters, e.g., timestamps, or using any other synchronization or referencing data.

Regardless of the level of correspondence between the input and degraded video sequence, and the manner by which the correspondence is determined, according to examples of the presently disclosed subject matter, the device for controlling the video content system can implement a full reference quality evaluation of the degraded video sequence, as will be described below. The term "full reference quality evaluation" is know in the art, and is used to describe an evaluation process wherein for any degraded video frame there is available a corresponding input current frame and if preceding frames are involved in the evaluation for any preceding degraded frame there is available a corresponding preceding input frame, and the quality evaluation is based on processing the resulting frame pairs and frame groups, as described in the examples of the presently disclosed subject matter provided below. This short definition of the term "full reference" is provided in accordance with the term's conventional meaning in the art. This definition is non-limiting and is provided for convenience purposes. Accordingly, the interpretation of the term "full reference quality evaluation" is not limited to the herein definition, and rather it should be given its broadest reasonable interpretation.

By way of example, the quality evaluation process implemented by the device for controlling the video content system, and the respective configuration instruction provided by the device can enable control over a visual quality of a degraded video sequence (e.g., an encoded, compressed or distributed video sequence). In this regard, it would be appreciated that video content systems typically implement a set of configuration parameters which can be modified or adjusted to control the system working point. The term "working point" is know in the art, and is used to describe a system's configuration settings. For example, for a video compression system the working point can include bit-rate settings and other encoder settings (profile, encoding tools, encoding modes etc.). This short definition of the term "working point" is provided in accordance with the term's conventional meaning in the art. This definition is non-limiting and is provided for convenience purposes. Accordingly, the interpretation of the term "working point" is not limited to the herein definition, and rather it should be given its broadest reasonable interpretation. According to examples of the presently disclosed subject matter, the video content system can be configured to modify a certain process, feature, parameter or configuration which influences the degradation level of the degraded video sequence or to modify an allocation of a certain resource that is associated with the system and which influences the degradation level of the degraded video sequence (e.g., a distribution resource).

For example, the video content system can be a video content distribution system and can include a video encoder that may be used to encode an input video sequence for distribution. The parameters, and possibly also the working mode, of the video encoding process can be adjustable and can be modified according to an instruction from the device for controlling the video content system. Further by way of example, the adjustable parameters of the video content system can include a target bit-rate which can be fed to an encoder rate-control module. Another example of adjustable parameters of the video content system can be the encoding mode settings, such as a profile selection and/or a level as defined, for example, in the underlying encoding specification or standard (e.g., H.264). Yet another example of adjustable parameters of the video content system can be parameters that control the video content system resource allocation, such as bandwidth allocations for various users, or allocation of channels to different users, etc.

According to examples of the presently disclosed subject matter, a device for controlling a video content system can be configured to evaluate a quality of a degraded video sequence (e.g., a video clip), using a quality measure that is based on an inter-frame quality score and an intra-frame quality score, which is computed for a plurality of video frame from the candidate degraded video sequence. Examples of possible procedures which can be implemented by the device for controlling the video content system, including various inter-frame and intra-frame quality measures are detailed below.

Further according to examples of the presently disclosed subject matter, and as also described below, a set of per-frame inter-frame and intra-frame quality scores can also be pooled by the device for controlling the video content system to provide a global quality score. By way of example, any standard norm or averaging operation can be used for pooling of the quality score. Further by way of example, a minimum value can be computed over the frame quality scores.

Based on the quality score calculated by the device for controlling the video content system, corresponding configuration instructions, e.g. configuration parameters, can be provided to the video content system, and the configuration instructions may enable the video content system to adjust an operation or a resource allocation according to the configuration instructions. The adjustment by the video content system can change the level of degradation of the degraded video sequence, for example to a level which meets the quality criterion which is implemented by the device for controlling the video content system. By way of example, if the quality of a degraded video sequence is characterized by the device for controlling the video content system to be below the desired range or threshold, the device can provide configuration instructions that are effective for causing the video content system to increase a bit-rate allocation for a corresponding video content distribution session, and thereby to reduce the quality degradation of the video sequence. In another example, if the quality of a degraded video sequence is characterized by the device for controlling the video content system to be above a desired range or threshold, the device can provide configuration instructions that are effective for causing the video content system to decrease the target bit-rate provided to a video encoder operating within or associated with the video content system.

For convenience, examples of the device for controlling a video content system are now described with reference to a video compression system. Examples of the presently disclosed subject matter are thus described, by way of example, with reference to a compression quality evaluation implementation of the device for controlling a video content system. Still further by way example, and for convenience purposes, the compression quality evaluation implementation of the device for controlling a video content system is referred to as the "device for controlling a compression of a video frame from a video sequence". It would be appreciated that the reference made in the current disclosure to the device for controlling a compression of a video frame from a video sequence can be replaced with a reference to the device for controlling a video content system. Furthermore, it would be appreciated that the examples of the presently disclosed subject matter discussed herein with reference or in relation to a compression or encoding process can be readily adapted by those versed in the art to be applicable to other quality degrading processes which can be implemented by a video content system, and that the examples of the presently disclosed subject matter provided herein in respect of an encoding or compression process can also be readily used to control a quality degradation introduced by other processes that are implemented by a video content system.

In the following examples of the presently disclosed subject matter, the processing that is performed by the video content system is a compression of an input video sequence, and the result of the compression is a corresponding compressed video sequence. The input video sequence can consist of two or more input video frames or corresponding digital data (for example, the input data can be in RAW format). The two or more input video frames can consist of at least a current input frame, which is the frame that is currently being compressed and the compression of which is currently being evaluated, and a preceding input frame, which is a frame that precedes the current input frame. It would be appreciated that the two or more input frames which constitute the input video sequence can be in RAW format, for example in the YUV domain, or can be encoded or compressed video frames, for example, MPEG-4 or H.264 frames.

Further by way of example, the degraded video sequence can be a sequence of encoded or compressed video frames consisting of two or more video frames. The perceptual quality of the compressed video sequence can be generally degraded compared to the input video sequence, although it would be appreciated that some of the frames in the degraded sequence can have substantially the same quality (non-degraded) compared to the corresponding frames in the input video sequence. For example, for some frames in the compressed video sequence the encoder can apply very fine compression or no compression at all. Still further by way of example, the perceptual quality of the compressed video sequence can be generally degraded compared to the input video sequence due to deeper compression of the compressed video sequence compared to the input video sequence (which may or may not be compressed).

Still further by way of example, for a given current input video frame, the device for controlling a compression of a video frame from a video sequence, can be configured to evaluate the perceptual quality of a candidate compressed frame. Further by way of example, the initial candidate compressed frame can be generated by the video encoder using some initial quantizer parameter. For example, the video encoder can use a relatively fine quantizer parameter.

The input video frame and the corresponding initial candidate compressed frame can be obtained by the device for controlling the video encoder, and the device can evaluate, in a process that will be described in detail below, the quality of the initial candidate compressed frame. In case it is determined that the initial candidate compressed frame does not meet a quality criterion that is implemented by the device for controlling the video encoder, the device can output an instruction to the video encoder that is effective to cause the video encoder to once more compress the current input frame using updated compression parameter values. The updated compression parameter values can be provided by the device for controlling the video encoder, or can be selected or determined outside the device, for example, according to a predefined algorithm. As a result of the repeated compression process (with different compression parameter values), an updated candidate compressed frame is generated. The quality evaluation process for the current input frame is now repeated, this time based on the updated candidate compressed frame. The quality evaluation process and the repeated compression of the current input instructed by the quality evaluation process can be repeated as many times as necessary, for example, until for a current candidate compressed frame the quality criterion implemented by the device is met. It would be appreciated that in some cases the initial candidate compressed frame can meet the quality criterion, and the evaluation process can terminate with the initial candidate compressed frame.

Configurations of the device for controlling a compression of a video frame from a video sequence according to examples of the presently disclosed subject matter, which enable the iterative compression quality evaluation process including the provisions for maintaining a candidate compressed frame, and if necessary replacing the candidate compressed frame with an updated candidate compressed frame, until for some candidate compressed frame a quality criterion is satisfied, and then instructing the encoder to use that candidate compressed frame as the output compressed frame, are described below.

According to examples of the presently disclosed subject matter, for a current input frame, the device for controlling the video encoder can buffer or can cause an external memory or storage resource to buffer a preceding input frame, which is a frame from the input video sequence which precedes the current input frame. The preceding input frame can be an input frame in respect of which a compression evaluation process has already been implemented, and a compressed output frame was already provided. For example, the preceding compressed frame which corresponds to the preceding input frame could have been generated under the control of the device for controlling the video encoder according to examples of the presently disclosed subject matter. Further by way of example, the preceding compressed frame which corresponds to the preceding input frame can also be buffered and can be available for use by the device for controlling the video encoder in the quality evaluation process that is implemented for the current input frame.

It would be appreciated that the preceding input frame used in the evaluation process implemented by the device for controlling the video encoder can be the frame which immediately precedes the current input frame in the input video sequence or any other frame that was previously compressed, including a frame which was compressed according to an instruction from the device for controlling the video encoder and based on the quality evaluation process implemented by the device (in this example, the preceding input frame is the frame before the compression). In other examples, more than one preceding frame are used as reference in the quality evaluation process implemented by the device for controlling the video controller, for example, an average preceding input frame can be computed based on several preceding input frames, and an average preceding compressed frame can be computed based on the corresponding compressed frames.

Further details with regard to the device for controlling a compression of a video frame from a video sequence and with respect of a method of controlling a compression of a video frame from a video sequence are now provided by way of example to the accompanying drawings.

Turning now to FIG. 1, there is shown a block diagram illustration of a device for controlling a compression of a video frame from a video sequence, according to examples of the presently disclosed subject matter. According to examples of the presently disclosed subject matter, the device 100 for controlling a compression of a video frame from a current input video sequence, can include an interface module 10, a buffer 20, an encoding configurator 30, a processor 40 and a compression quality evaluation module 50. It would be appreciated that a configuration that is similar to the configuration shown in FIG. 1 can be used by the device for controlling a video content system according to examples of the presently disclosed subject matter.

According to examples of the presently disclosed subject matter, the video sequence can include at least a current input frame 112 and a preceding input frame 122. The current input frame 112 can be received at the device 100 through the interface 10. The current input frame 112 can be an encoded or compressed frame and the interface module 10 can include a decoder to decode the current input frame 112. According to another example, the current input frame 112 is decoded outside the device 100, and the current video frame 112 is received at the device 100 as RAW pixels, for example in the YUV domain. By way of non-limiting example, the device 100 can be used for controlling a recompression process that is applied to a compressed video sequence. In further examples, the device 100 can be used for controlling a raw video sequence or for controlling transcoding of a video sequence—i.e. where the input video sequence is encoded say with H.263 and the device 100 is used to control the transcoding of the H.263 video sequence into say a H.264 format video sequence.

In some examples of the presently disclosed subject matter, the interface module 10 can be omitted from the device 100, for example, if the input that is fed or is otherwise received at the device 100 and the output 132 of the device does not necessitate interfacing. In other examples of the presently disclosed subject matter, the interface 10 can be implemented and used for basic interfacing operations to enable connection and/or communication of the device 100 with external functional entities, such as an encoder, a decoder, a streamer or an external buffer.

As mentioned above, the device 100 can include a buffer 20. According to examples of the presently disclosed subject matter, the buffer 20 can be adapted to hold a preceding input frame 122 and a preceding compressed frame 124 corresponding to the preceding input frame 122. The preceding compressed frame 124 is also referred to herein as the "stored compressed frame". As mentioned above, in some examples of the presently disclosed subject matter, the preceding input frame 122 can be a frame of the input video sequence which immediately precedes the current input frame 112. However, it should be appreciated that in further examples of the presently disclosed subject matter, the term "preceding" does not necessarily refer to the temporal order of the frames, and the preceding input frame or candidate compressed frame is not necessarily the frame which in the temporal order immediately precedes the current input frame or the current candidate compressed frame, respectively, in the temporal order. In this regard, it would be appreciated that according to further examples of the presently disclosed subject matter, the term preceding can relate to a frame which precedes the current (input or compressed candidate) frame in the coding order, which is not necessarily the temporally preceding frame, for example when B-frames are used. The stored compressed frame 124 can be the product of an encoding (or a compression) process, in which the now preceding input frame 122 was the current input frame.

The device 100 according to examples of the presently disclosed subject matter can be used for controlling an encoding process of the input video sequence, including the encoding of the preceding input frame 114, and the result of that process can be the preceding compressed frame 124. Device 100 can also be used for controlling an encoding process of the input frame 112, and the result of that process can be the candidate compressed frame 122 that meets the quality criterion implemented by the device 100. Further by way of example, the compressed frame(s) which is encoded/compressed according to instructions provided by the device 100 can be provided, possibly after being decoded, to the device 100 and can be used for determining the encoding/compression configurations for the subsequent frame(s) of the video sequence, as will be explained in further detail below. In other examples, the preceding compressed frame 124 can be a result of any other encoding/compression process, and its encoding/compression is not necessarily associated with the operation of the device 100.

It would be appreciated that the device 100 according to examples of the presently disclosed subject matter can be used for controlling a compression of a video frame such that the output frame meets a quality criterion, for example, a perceptual quality criterion. In some examples of the presently disclosed subject matter, the quality of a compressed or recompressed video frame can be evaluated by the device 100 as part of the sequence of video frames, using the preceding input frame and the corresponding preceding compressed frame, as will be explained in further detail below.

According to examples of the presently disclosed subject matter, the encoding configurator 30 can be operatively connected to a video encoder (not shown). In some examples of the presently disclosed subject matter, the video encoder can be implemented outside the device 100, and the encoding configurator can communicate with the external video encoder, possibly through the interface module 10. In other examples, the video encoder can be implemented as part of the device 100.

According to examples of the presently disclosed subject matter, the encoding configurator 30 can be adapted to instruct the video encoder to compress the current input frame 112 according to compression parameter values, giving rise to a candidate compressed frame 122. Further by way of example, the encoding configurator 30 can be adapted to determine the compression parameter values that are to be used for compressing the current input frame 112.

In this regard it would be appreciated that the compression parameters in many video encoders can be set either by an external parameter that is provided by an operator of the encoder, and/or by a rate-control module within the encoder. According to examples of the presently disclosed subject matter, the encoding configurator 30 can be adapted to determine the values for one or more of the following compression parameters: the quantizer parameter ("QP"), bit-rate parameter, a compression level indicating a preconfigured set of parameters in a given encoder. Further by way of example, any of the above compression parameters can be used by the device 100 to configure and control the compression process. For convenience purposes, some examples of the presently disclosed subject matter are now described with reference to the QP, however, it should be noted that the examples provided herein with reference to the QP can also be applied to other types of compression parameters. Thus, according to examples of the presently disclosed subject matter, methods to set the quantizer value by the rate control module are varied. Often the encoder is aiming for a target bit-rate and therefore the quantizer for the frame is set according to indications of the current buffer status based on the bit-rate obtained thus far while possibly combining considerations related to the estimated frame complexity, and then is adapted per macroblock according to the MB characteristics. In some examples of the presently disclosed subject matter, the device 100 can operate in cooperation with a rate-control module of the encoder (or that is associated with the encoder) to adapt the QP per macroblock, but overwrite the frame QP value (also known as the average QP) with a value derived from the target quality criteria implemented by the device 100. The frame can be initially encoded with an estimate for an appropriate QP value. Examples of the initial QP parameter can include an arbitrary parameter, the QP used for compressing a preceding frame or an estimation that is based on some statistical analysis of the QP selected for preceding frames. According to examples of the presently disclosed subject matter, if the quality is determined by the device 100 to be too low, the quantization can be refined (i.e. lower value) based on an appropriate instruction from the device 100, if the quality is above a target range implemented by the device 100, the device can instruct the encoder to generate a (new) candidate compressed frame using coarser quantization—thus the quantization parameter is increased. According to examples of the presently disclosed subject matter, some convergence or optimization criterion can be implemented in order to select a "good enough" candidate compressed frame that meets the quality criterion, and the process need not necessarily continue until the best result is achieved. In this regard, it would be appreciated that according to examples of the presently disclosed subject matter, any known search or root-finding method can be to converge to the target QP value, such as—but not limited to, the Bisection method, Secant based search etc. The candidate compressed frame 114 can be temporarily stored or memorized, for example, in a cache (not shown) or in the buffer 20.

Figure 2:
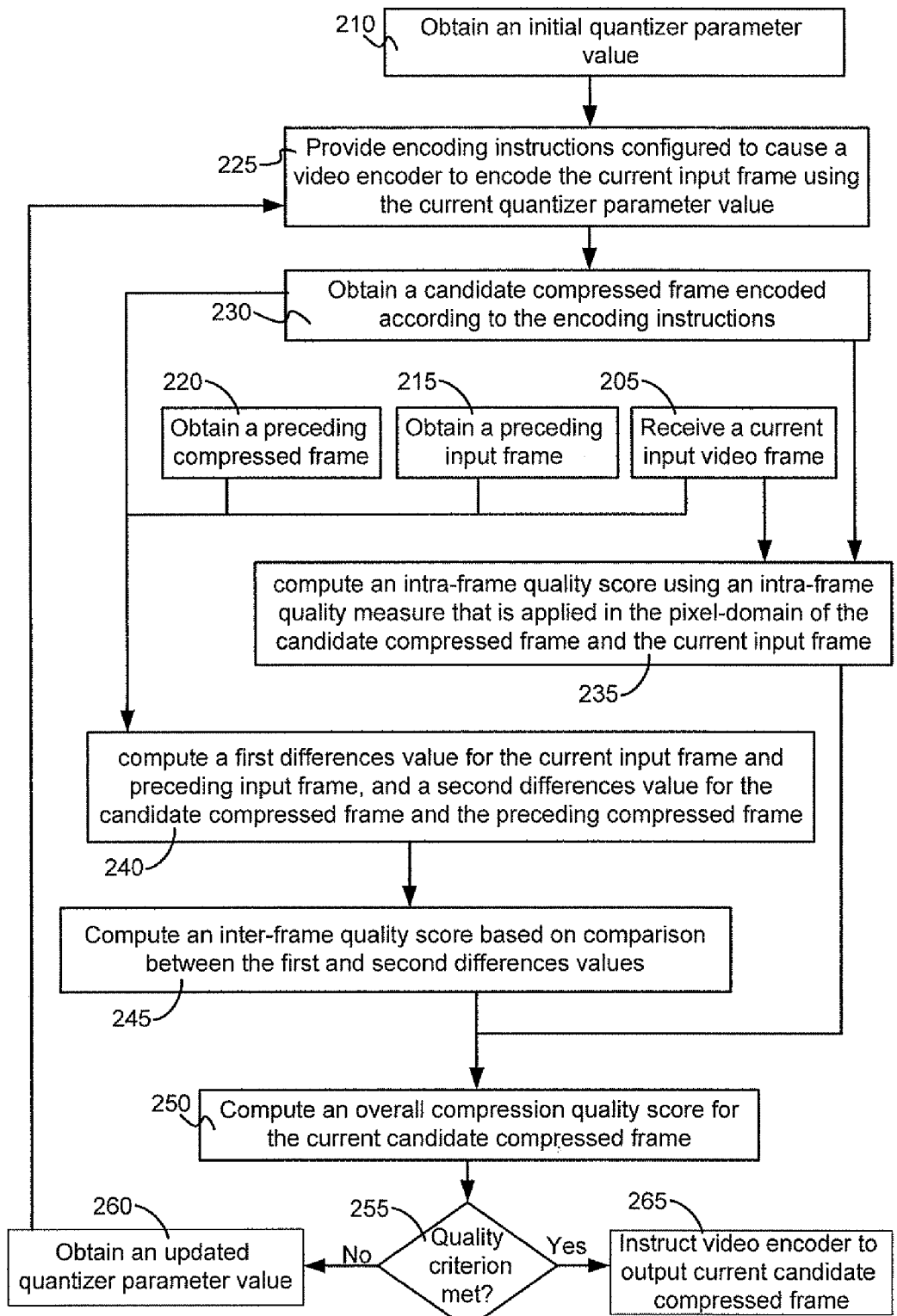
FIG. 2 is a flowchart illustration of a method of controlling a compression of a video frame from a video sequence, according to examples of the presently disclosed subject matter.

Reference is now made to FIG. 2, which is a flowchart illustration of a method of controlling a compression of a video frame from a video sequence, according to examples of the presently disclosed subject matter. As mentioned above, according to examples of the presently disclosed subject matter, the description of the method of controlling a compression of a video frame from a video sequence is provided as an example of a method of controlling a video content system. The video content system can implement various quality degrading processes, including processes associated with video sequence distribution, and the examples of the method of controlling a compression of a video frame can be used, mutatis-mutandis, to control a video content system, and in particular a quality degrading process that is implemented by the video content system.

For convenience, examples of the presently disclosed subject matter of the method of controlling a compression of a video frame shall now be described with reference to the device for controlling a compression of a video frame shown in FIG. 1. The attribution of the operation described herein to the various components of the device for controlling a compression of a video frame shown in FIG. 1 is made by way of example. It would be appreciated that one or more components device for controlling a compression of a video frame shown in FIG. 1 can be omitted, combined and additional components can be added to the device, and the operations described herein can be carried out by the corresponding components or such a device. It would also be appreciated that the method of controlling a compression of a video frame can be implemented on any suitable device or system, including but not limited to the device for controlling a compression of a video frame that is described herein, including with reference to FIG. 1. In other examples, the method of controlling a compression of a video frame can be implemented on a standard or custom built computerized system that includes a processor, memory and a tangible storage device. The method of controlling a compression of a video frame can be embodied in computer readable program code. The computer readable program code can be stored on a tangible storage device and can be executed by the processor to perform the operations described herein. The computerized system on which the method of controlling a compression of a video frame can be implemented on can be a standalone computerized system or can be distributed across a plurality of inter-connected computerized devices.

Turning now to a description of an example of a method of controlling a compression of a video frame according to examples of the presently disclosed subject matter, at some point, a compression quality evaluation process can be initiated with respect to a given input video frame. According to examples of the presently disclosed subject matter, the evaluation process can be used to select compression parameter values for compressing a current input frame 112 such that the relative perceptual quality of a respective output compressed frame meets a compression quality criterion.

According to one non-limiting example, the compression quality evaluation process can be initiated when a current input frame 112 is received (block 205) at the device 100. The current input frame 112 can be the frame which is about to be encoded or compressed by an encoder, and the compression quality evaluation process can be utilized to control the compression of this frame to enable the encoder to provide a respective output compressed frame which meets a quality criterion that is implemented by the device 100.

It would be appreciated, that other triggers can be used to initiate the compression quality evaluation process, and that whichever event triggers the compression quality evaluation process, some data representing the current input frame 112 is received by the device 100 and is used in the compression quality evaluation process.

According to examples of the presently disclosed subject matter, the data representing the current input frame 112 can be the actual video frame, or some other data which is representative of the frame, including data sampled from the original frame. The data representing the frame can be encoded, or in RAW format, and the frame can be compressed or not.

Resuming the description of FIG. 2, at block 210 an initial compression parameter value can be obtained, for example by the encoding configurator 30. The initial compression parameter value can be preset or can be computed or selected. For example, the initial compression parameter value can be manually selected by an operator of the device 100. In a further example, the initial compression parameter value can be computed or selected according to a characteristic of the current input video frame 112, such as frame resolution, pixel value energy or variance, Sum of Absolute Difference compared to the preceding frame, according to a characteristic of a preceding input video frame 122, or according to a characteristic of the input video sequence.

As will be further discussed below, according to examples of the presently disclosed subject matter, the compression quality evaluation process implemented with respect to a given current input frame 112 by the device 100 can be an iterative process, and as part of the compression process controlled by the device 100, the encoding configurator 30 can provide the encoder with compression parameter value(s) for each iteration of the compression process. The configurator 30 can use any known or yet to be devised incrimination, optimization and/or search algorithm for selecting or computing a compression parameter value for each iteration of the compression quality evaluation process. Examples of algorithms for determining a compression parameter value can include but are not limited to: exhaustive search, search using root finding algorithms such as Bisection, Newton-Raphson, Secant or others. According to a further example of the presently disclosed subject matter, the compression parameter values that are used by the encoding configurator 30 are preset, and at each iteration the respective compression parameter value from the preset series of compression parameter values is selected. According to still a further example of the presently disclosed subject matter, an operator of the device is still partially involved in setting the compression parameter values that are used by the encoding configurator 30 can be at least partially manually set by an operator of the device 100.

Once a quantizer parameter value is obtained, the encoding configurator 30 can adapted to provide encoding instructions 132 to the video encoder (block 225). The encoding instruction can be configured to cause the video encoder to encode the current input frame using the current compression parameter value. At block 230 a candidate compressed video frame 114 can be received at the device 100. The candidate compressed frame 114 can be the video frame which the video encoder generated by compressing the current input frame 112 according to the instructions 132 received from the device 100. For example, the candidate compressed frame 114 can be a result of a compression of the current input frame 112 according to the compression parameter value provide by the device 100.

It would be appreciated that the reference made herein to any one of current input frame 112, the preceding input frame 122, the current candidate compressed frame 114 and the preceding compressed frame 124 can relate to data which corresponds to and represents the respective video frames. For example, instead of the actual video frames, which may be encoded video frames, the data that is fed to the device 100 and with respect of which the method of evaluating a compression of a video frame is implemented can be RAW digital data which corresponds to the actual video frames. In other examples, the device 100 includes a decoder (not shown) and can receive the encoded video frame or a bitstream representing an encoded frame sequence, and decode the video frames internally.

Based on the current input video frame 112 and the current candidate compressed video frame 114 the compression quality evaluation module 50, possibly in cooperation with the processor 30, can compute an intra-frame quality score. For example, the compression quality evaluation module 50 can compute an intra-frame quality score using an intra-frame quality measure that is applied in the pixel-domain of the current candidate compressed video frame 114 and the current input frame 112 (block 235). More details regarding the computation of the intra-frame quality score are provided in examples of the presently disclosed subject matter which are provided below.

For a given current input video frame 112 (starting from the second frame of the input video sequence) a preceding input frame 122 (block 215), and a stored compressed frame 124, which is also referred to herein as the preceding compressed frame, can be obtained (block 220). According to examples of the presently disclosed subject matter, the preceding compressed frame 124 is the compressed frame which corresponds to the preceding input frame 122. As mentioned above, the preceding compressed frame 124 can be stored within a buffer 20 of the device 100. The preceding input frame 122 can also be, but is not necessarily, stored within the buffer 20. For example, the preceding input frame 122 can be stored in the buffer 20 as part of or in association with a previous iteration of the compression quality evaluation process, in which the now preceding input frame 122 was the current input frame. Likewise, the preceding compressed frame 124 corresponding to the preceding input frame 122 can be stored in the buffer 20 as part of or in association with a previous iteration of the compression quality evaluation process, in which the now preceding compressed frame 124 was the current compressed frame.

Using the data inputs which correspond to the current input frame 112, the preceding input frame 122, the current candidate compressed frame 114 and the preceding compressed frame 124, an inter-frame quality score can be computed. According to examples of the presently disclosed subject matter, in order to allow the compression quality evaluation module 50 to compute the inter-frame quality score, a processor 30 can be utilized to compute a first differences value from the current input frame and preceding input frame, and a second differences value from the candidate compressed frame and the preceding compressed frame (block 240). The compression quality evaluation module 50, possibly in cooperation with the processor 30, can be adapted to determine an inter-frame quality score for the current candidate compressed frame based on a comparison between the first and second differences values (block 245).

Based on the computed intra-frame quality score and inter-frame quality score, the quality evaluation module 50, possibly in cooperation with the processor 30, can compute an overall quality score for the current candidate compressed frame 114 (block 250). A quality criterion can be implemented by the quality evaluation module 50, and the quality evaluation module 50 can use the quality criterion to evaluate the overall quality score for the current candidate compressed frame 114, to determine whether the current candidate compressed frame 114 meets the quality criterion (block 255). The target quality can be set to obtain a pre-determined quality level, for instance the target quality can be tuned for perceptually lossless recompression, as determined by a perceptually lossless quality measure implemented as part of the quality evaluation process. In a further example, the quality criterion can be adapted for a specific video sequence, to provide a particular target bit-rate at constant perceptual quality.

According to examples of the presently disclosed subject matter, the encoding configurator 30 can be responsive to a current candidate compressed frame 114 failure to meet the quality criterion, for obtaining an updated compression parameter value (block 260), and blocks 225 through 255 can be repeated according to the updated compression parameter value and according to the corresponding (new) current candidate compressed frame. According to examples of the presently disclosed subject matter, the updated compression parameter value is computed based on the previous compression parameter value. According to one example of the examples of the presently disclosed subject matter, the updated compression parameter value can be based on the value used in a previous iteration of the quality evaluation process with a stepped modification, for example deltaQP can be added (or subtracted) from the compression parameter value that was used in a previous iteration, where (in the case of an addition) deltaQP is negative if the quality was "too low" and positive if quality was "too high". The deltaQP factor can also be adaptive, in which case, deltaQP can be adapted, for example, according to the distance from the target quality. In further examples, the quality evaluation process can include an iterative search using known root finding algorithms such as Bisection, Newton-Raphson, Secant or others.

According to examples of the presently disclosed subject matter, when a current candidate compressed frame 114 meets the quality criterion implemented by the quality evaluation module 50, the encoding configurator is configured to instruct the video encoder to provide the current candidate compressed frame 114 as the output frame for the respective current input frame 112 (block 265). Thus, in some examples of the presently disclosed subject matter, the method of controlling a compression of a video frame, can enable a video encoder to provide for a given input frame a respective compressed video frame, whose overall quality, measured as a combination of the compressed frame's inter-frame and intra-frame relative perceptual quality, meets a desired quality criterion. According to further examples of the presently disclosed subject matter, the method of controlling a compression of a video frame, can further enable the video encoder to provide a near maximal compression rate for a given input frame while maintaining the overall relative perceptual quality of the respective compressed video frame at a level that meets a desired quality criterion.

Figure 3:
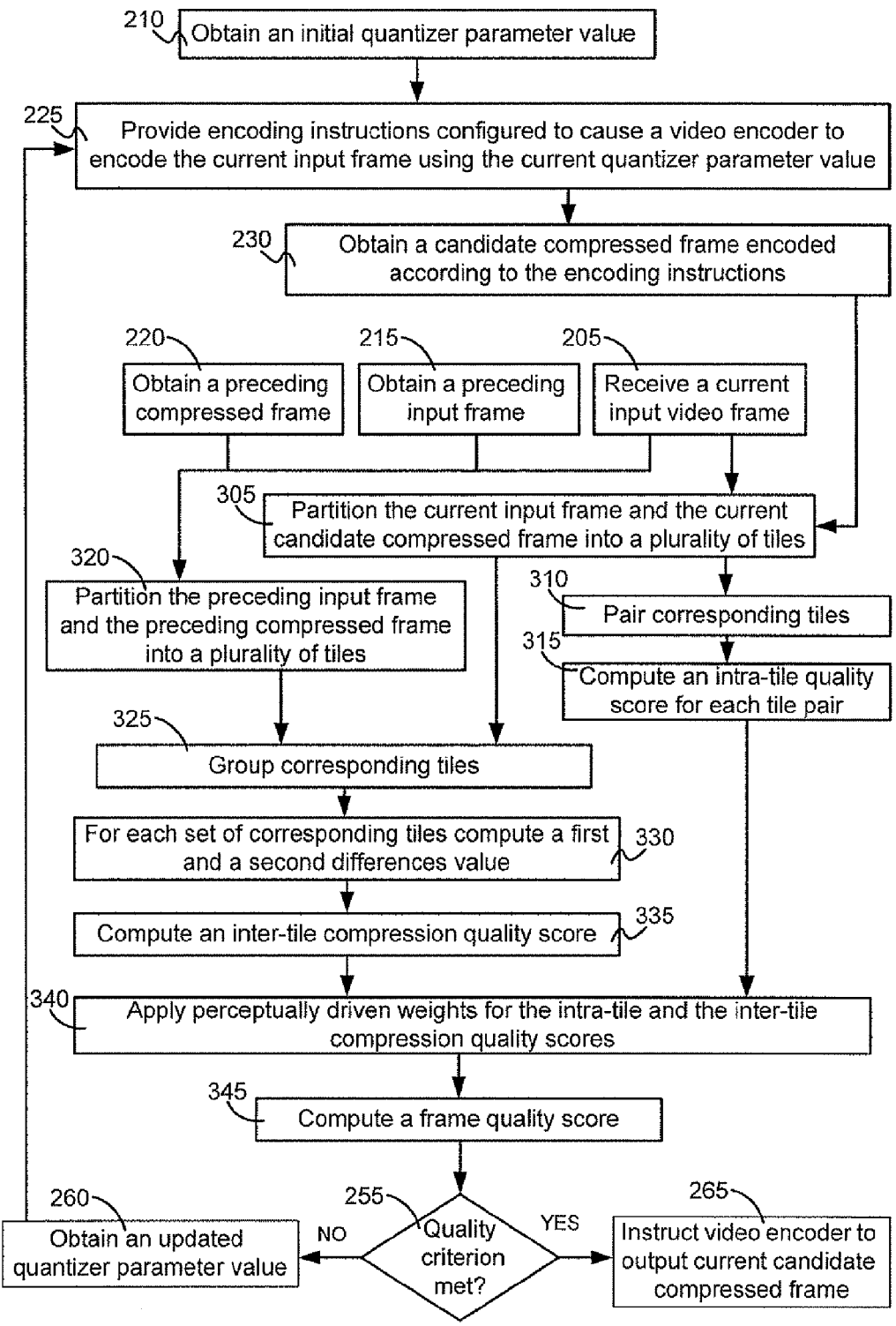
FIG. 3 is a flowchart illustration of the method of controlling a compression of a video frame shown in FIG. 2 with the addition of tiling processing.

Reference is now made to FIG. 3, which is a flowchart illustration of the method of controlling a compression of a video frame shown in FIG. 2 with the addition of tiling processing. Blocks 205-230 are essentially unchanged from FIG. 2. At block 305, the current input frame 112 and the current candidate compressed frame 114 are partitioned into a plurality of tiles. According to examples of the presently disclosed subject matter, the device 100 can include a frame partitioning module 60 that is adapted to partition video frames into tiles of a predefined size. Further by way of non-limiting example, tile dimensions can be some multiple of coding block size and examples can be: 64×64, 80×80, 128×128. Further by way of example, the tiles can be square but can also have other shapes or forms. Still further by way of example, tile size can be adapted for instance according to frame resolution, such that, for example, smaller tiles can be used for smaller frames. Yet further by way of example, tile size can be calculated according to the number of tiles that would fit into a given frame, with possible rounding to a whole multiple of coding block size.

Tiles from the current input frame 112 are matched with corresponding tiles from the current candidate compressed frame 114 to provide a plurality of tile pairs (block 310). For example, a given tile from the current input frame which is defined over a given area of the current input frame 112 is matched with a tile from the current candidate compressed frame which is defined over the corresponding area of the current candidate compressed frame 114.

Once the tiles are paired, an intra-tile quality score is computed for each tile pair (block 315). For example, the compression quality evaluation module 50 can compute an intra-tile quality score using an intra-tile quality measure that is applied in the pixel-domain of each current tile pair. More details regarding the computation of the intra-frame quality score are provided in examples of the presently disclosed subject matter which are discussed below.

The preceding input frame 122 and the preceding compressed frame 124 can also be partitioned (block 320) and corresponding tiles from the current input frame 112, the preceding input frame 122, the current candidate compressed frame 114, and the preceding compress frame 124 can be grouped (block 325). By way of example, for each group of tiles, a first differences value can be computed from a tile of the current input frame and a respective tile from the preceding input frame, and a second differences value can be computed from a respective tile of the candidate compressed frame and a respective tile of the preceding compressed frame (block 330). Further by way of example, an inter-tile quality score can be computed for a tile of a current candidate compressed frame based on a comparison between the respective first and second differences values (block 335).

According to examples of the presently disclosed subject matter, perceptually driven weights can be applied to at least some of the intra-tile and inter-tile quality scores that were computed for the current candidate compressed frame 114 (block 340), for example by a perceptual weighting module 72 that is implemented as part of the tile score pooling module 70. According to examples of the presently disclosed subject matter, the perceptual weighting module 72 can be adapted to provide more or less weight to particularly dark or particularly saturated tiles. Further by way of example, the perceptual weighting module 72 can be adapted to give more or less weight to poor performing tiles (tiles with the lowest quality scores). Still further by way of example, the perceptual weighting module 72 can adapted to give different emphasis to different tiles depending on their location in the frame using appropriate location based weighting of tiles, for instance, the perceptual weighting module 72 can apply weights which emphasize tiles located at the frame's center. An example of an implementation of the method of controlling a compression of a video frame that includes the application of weights to at least some intra-tile and inter-tile quality scores computed for a current candidate compressed frame is provided below.

According to examples of the presently disclosed subject matter, the intra-tile and inter-tile quality scores computed for a given current candidate compressed frame, can be pooled together, possibly after perceptual weighting, to provide a frame quality score for the current candidate compressed frame 114 (block 345). Blocks 255-265 are applied with respect to the frame quality score and are similar to the corresponding blocks in FIG. 2 which were described above.

According to examples of the presently disclosed subject matter, the intra-frame quality score computation can include computing a pixel domain quality measure. Further by way of example, a full-reference pixel-domain quality measure can be used. Still further by way of example, computing an intra-frame quality score can be based on a pixel-wise difference between the current input frame 112 and the current candidate compressed frame 114.

According to examples of the presently disclosed subject matter, the device for controlling a compression of a video frame 100 can have an intra-wise quality evaluation module 80. The intra-wise quality evaluation module 80 is configured to operate in the intra-frame or in the intra-tile domain and with respect to a candidate compressed frame 114 versus a current input frame 112 or with respect to a tile pair (a tile from the candidate compressed frame versus a respective tile from the current input frame). Accordingly, the intra-wise quality evaluation module 80 can receive as input a current candidate compressed frame 114 and a current input frame 112 or a tile pair (a tile from the candidate compressed frame and a respective tile from the current input frame) and can compute an intra-frame quality score or an intra-tile score using a full-reference pixel-domain quality measure.

By way of example, the tiles can be generated by a partitioning module 60 that is implemented as part of the compression quality evaluation module 50, and the tile scores can be pooled by a score pooling module 70 which can also be implemented as part of the compression quality evaluation module 50.

There is now provided a description of various modules of the intra-wise quality evaluation module 80. According to examples of the presently disclosed subject matter, one or more of the modules of the intra-wise quality evaluation module 80 described below can be utilized to enable the device 100 to compute an intra-frame quality score, which in turn can be used to compute a frame quality score. It would be appreciated that some of the modules and/or some of the quality measures that are described here as being used for computing the frame quality score, including in particular some of the modules and/or quality measures that are described here as being used for computing the intra-frame quality score, are optional. It would also be appreciated, that the intra-wise quality evaluation module 80 and the modules which are implemented as part of the intra-wise quality evaluation module 80, and the corresponding quality measures' computation procedures, which are described here by way of example can be configured according to the input that is provided to the modules and based on which the computation procedures are implemented.

As mentioned above, for convenience, and by way of example, the intra-wise quality evaluation module 80 is described herein as having a plurality of modules, which are each operable for computing some intra-wise quality measure. In case the intra-wise quality evaluation module 80 includes more than one module, the two or more intra-wise quality measures provided by the modules of the intra-wise quality evaluation module 80 can be combined, and can be implemented, for example, on standard computer hardware. Furthermore, in case the intra-wise quality measures provided by the modules of the intra-wise quality evaluation module 80 are configured for a given frame pair to apply the intra-wise quality measures to a plurality of corresponding tile pairs, the tile pairs' scores can be pooled to provide a quality measure for the entire frame (or frame pair), as will be described below.

A set of operations which can be implemented according to examples of the presently disclosed subject matter for calculating a full-reference pixel-domain quality measure is now described. For convenience the full-reference pixel-domain quality measure is described according to an example of an implementation of an intra-wise quality evaluation module 80 and a pixel-wise difference evaluation module 120. It should be noted however, that some examples of the method of controlling a compression of a video frame according to the presently disclosed subject matter, including the implementation of the full-reference pixel-domain quality measure computation, are not limited by the example that is shown in FIG. 1 and described herein with reference thereto, where the full reference pixel-domain quality evaluation is carried out by the intra-wise quality evaluation module 80 and the pixel-wise difference evaluation module 120.

According to examples of the presently disclosed subject matter, the intra-wise quality evaluation module 80 can include at least a pixel-wise difference evaluation module 120. Similarly, according to examples of the presently disclosed subject matter, the intra-frame quality score computation can include at least a full-reference pixel-domain quality measure computation. The full-reference pixel-domain quality measure computation that can be implemented by a pixel-wise difference evaluation module 120 is now described by way of example.

In some examples of the presently disclosed subject matter, the pixel-wise difference evaluation module 120 can receive as input a current candidate compressed frame 114 and a current input frame 112 and the full-reference pixel-domain quality measure can be computed based on the complete frames. In yet further examples of the presently disclosed subject matter, pixel-wise difference evaluation module 120 can receive as input a plurality of tile pairs which correspond to a frame pair, and the full-reference pixel-domain quality measure can be computed each time for a different tile pair, and the tile pair quality score can be combined or pooled, possibly after being processed to provide an intra-frame quality score.

According to yet further examples of the presently disclosed subject matter, for a given tile pair the pixel-wise difference evaluation module 120 can be configured to receive as input a plurality of tile pairs. The pixel-wise difference evaluation module 120 can be configured to further partition each the input tile pairs (or some subset thereof) into a plurality of corresponding sub-tile pairs. The pixel-wise difference evaluation module 120 can be configured to compute an intra sub-tile quality score for each one of the plurality of sub-tile pairs. The pixel-wise difference evaluation module 120 can be configured to process the plurality of sub-tile scores and can pool the plurality of sub-tile scores to provide a respective tile quality score. The tile score which results from the pooling of the (possibly processed) sub-tile scores can be provided as output of the pixel-wise difference evaluation module 120. According to examples of the presently disclosed subject matter, the pixel-wise difference evaluation module 120 can include a partitioning module 122 that can be utilized to partition input tile pairs into a corresponding plurality of sub-tile pairs. The pixel-wise difference evaluation module 120 can also include a tile score pooling module 124 that is configured to pool a plurality sub-tile scores into a corresponding tile score. Furthermore, according to examples of the presently disclosed subject matter, the pixel-wise difference evaluation module 120 can include a brightness normalization module 125 that is configured to normalize the intra-frame quality score based on a brightness parameter value of pixels in either the candidate compressed frame or the input frame.

Figure 4:
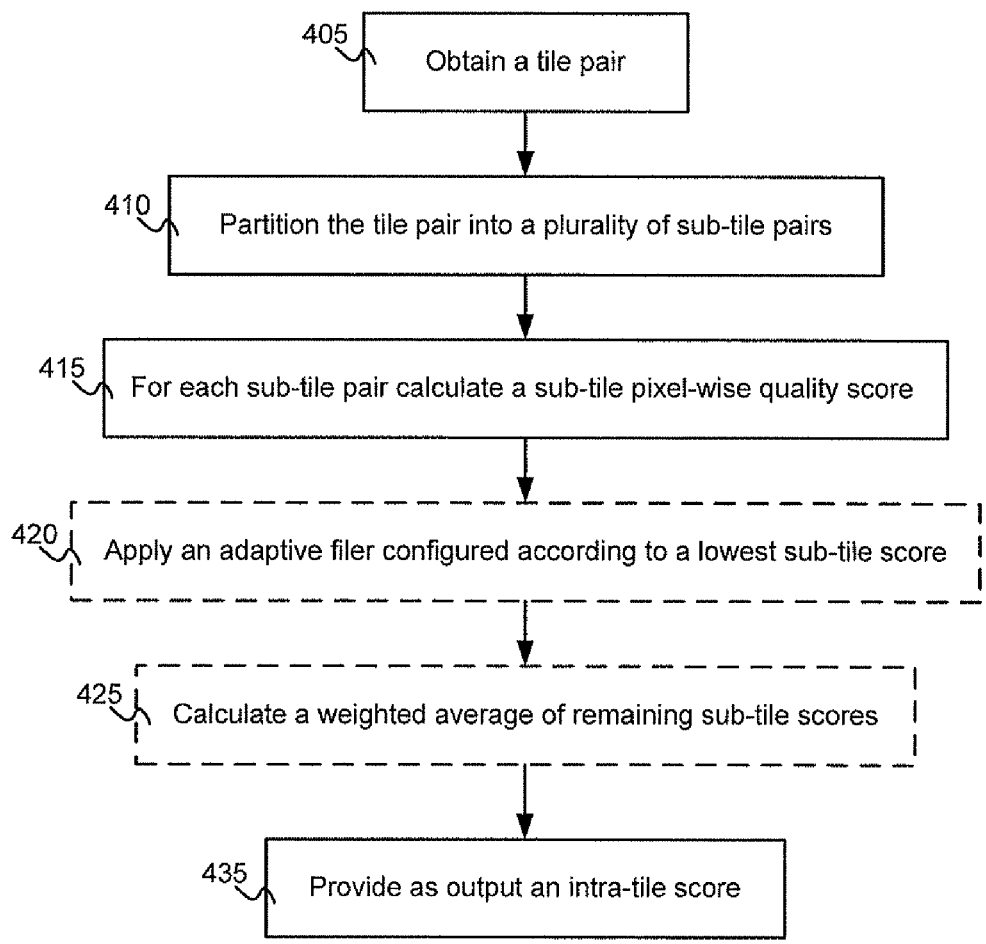
FIG. 4 is a flowchart illustration of a full-reference pixel-domain quality measure computation which can be implemented as part of a method of controlling a compression of a video frame, according to examples of the presently disclosed subject matter.

Reference is now made to FIG. 4, which is a flowchart illustration of a full-reference pixel-domain quality measure computation which can be implemented as part of a method of controlling a compression of a video frame, according to examples of the presently disclosed subject matter. In FIG.

4, it is shown, by way of non-limiting example, a process of computing a full-reference pixel-domain quality measure that is applied to a tile pair that is provided as input (block 405), and wherein the process includes partitioning the tile pair into a plurality of sub-tile pairs and pooling a respective plurality of sub-tile pixel-domain quality measure to provide as output a pixel domain quality measure for the respective tile of the current candidate compressed frame.

The input tile pair can be further partitioned to provide a respective plurality of sub-tile pairs (block 410). The partitioning of the tile pair can be carried out by the tile partitioning module 122. Each sub-tile pair can include respective areas of a current candidate compressed frame and of a current input frame. According to examples of the presently disclosed subject matter, for a sub-tile pair, a sub-tile pixel-wise score can be computed. The sub-tile pixel-wise score can be computed for each one of a plurality of sub-tile pairs (block 415). For example, block 415 can be repeated for each one of the plurality of sub-tile pairs which correspond to the input tile pair.

Optionally, the pixel-wise difference evaluation module 120 can apply an adaptive filter to the sub-tile scores. The adaptive filter can be configured according to a lowest sub-tile score and can be applied to the sub-tile pixel-wise scores (block 420). Further as an optional implementation, the pixel-wise difference evaluation module 120 can include a perceptual weighting module 126 that is configured to apply perceptually weights to the remaining sub-tile scores (after the filtering in block 420), and compute an weighted average of the sub-tile scores (block 425). As an alternative, the sub-tile scores can be otherwise combined to provide a pixel-wise tile score.

Finally, a pixel-wise tile score can be provided as output (block 430). The pixel-wise difference evaluation module 120 can include a sub-tile score pooling module 124 that is used for pooling sub-tile quality score to provide a corresponding tile score. As mentioned above, the output of the pixel-wise difference evaluation module 120 can be combined with other intra-wise quality evaluation score to provide an overall intra-tile or intra-frame quality score.

There is now provided a description of one possible implementation of a pixel-wise difference evaluation computation according to examples of the presently disclosed subject matter. As part of the possible implementation of a pixel-wise difference evaluation computation according to examples of the presently disclosed subject matter, a difference image, $T_D$ can be calculated for a candidate compressed frame tile. The difference image can be computed as a pixel-by-pixel subtraction of the tile from the current candidate compressed frame, $T_T$, from the respective tile in the current input frame, $T_R$.

A Peak-Signal-to-Noise-Ratio, or PSNR can be used to estimate $S_{PWD}$, the Pixel-Wise Difference quality score component for the tile pair. A mathematical representation of a possible estimation of the pixel-wise difference quality score component for the tile pair is provide in Formula (1), where $MAX_I$ is the maximum possible pixel value, for instance 255 for an 8 bit per pixel plane, and M, N are the tile dimensions:

$$PSNR = 20 \cdot \log_{10}\left(\frac{MAX_I}{\sqrt{\frac{1}{M \cdot N}\sum_{m=0}^{M-1}\sum_{n=0}^{N-1} T_D(m,n)^2}}\right) \quad \text{Formula (1)}$$

Calculating the PSNR jointly over an entire tile, can lead to loss of accuracy when the tile consists of a small area of detail set in a substantially 'blank' background. Therefore, as part of examples of the presently disclosed subject matter, a tile pair can be further partitioned into a plurality of sub-tiles. For example, a tile pair can be further partitioned into 4×4, or 16 equal sized sub-tiles, and the PSNR computation, such as was presented in Formula (1) can be applied to each one of the plurality of sub-tiles. It would be appreciated that for identical sub-tiles the PSNR score can be set to a certain predefined value to avoid the risk of division by zero. For example, for identical sub-tiles the PSNR score can be set to PSNR=1000.

In order to emphasize "poor" behaving sub-tiles, set in 'blank' backgrounds a filter can be applied to the sub-tile quality scores. For example, the following threshold to be used in pooling over psnrST—the PSNR sub-tile values can be implemented:

Set psnrMin to minimum of psnrST(i,j).

Set psnrThr to the minimum between 0.95*50 and 2.5*psnrMin.

In examples of the presently disclosed subject matter, the 0.95*50 value can indicate high absolute quality, since a PSNR of 50 can be considered "perfect", and If (psnrMin<psnrThr) psnrV is set to the average between psnrMin and the average of all components in psnrST(i,j) which are below psnrThr; otherwise psnrV is set to psnrMin. It would be appreciated that the above filtering and averaging can be operative for excluding well behaving, i.e. high valued PSNR, sub-tiles form the calculation of the tile score, if low quality, i.e. low valued PSNR, sub-tiles are present.

It would be appreciated that the values provided above are merely an example, and that examples of the presently disclosed subject matter can be implemented with other appropriate values for the parameters presented herein.

Beyond a certain threshold, which is labeled herein as THRPSNR, PSNR differences can become imperceptible. The inventors of the present disclosure have discovered that the THRPSNR threshold can be, at least to some degree, dependant on the average luminance of the respective frame, tile or sub-tile. Therefore, according to examples of the presently disclosed subject matter, a THRPSNR that is a function of the maximum luma value in the current input frame (although the maximum luma value in the current candidate compressed frame can also be used) can be implemented as follows:

$$THR_{PSNR} = \begin{cases} 50 & \text{if } maxV \geq 128 \\ 0.0016 \cdot maxV^2 - 0.38 \cdot maxV + 72.5 & \text{else} \end{cases} \quad \text{Formula (2)}$$

Where maxV is the maximum luma value in tile.

It would be appreciated that Formula 2 can also be implemented as an equivalent Look-Up-Table.

According to examples of the presently disclosed subject matter, the calculated PSNR based sub-tile quality score can be clipped. The PSNR based sub-tile quality score can also be computed so that it lies in the range [0,1]. The clipping and scaling is demonstrated in Formula (3):

$$S_{PWD} = \max\left(0, \min\left(\frac{PSNR}{THR_{PSNR}}, 1\right)\right) \quad \text{Formula (3)}$$

As mentioned above, according to examples of the presently disclosed subject matter, as part of evaluating the quality of a current candidate compressed frame, an inter-frame quality score can be computed. The inter-frame quality score together with the intra-frame quality score are used according to examples of the presently disclosed subject matter to evaluate the perceptual quality of a given current candidate compressed frame, and the evaluation of candidate compressed frames can be used to control a compression of a video frame.

By way of example of the presently disclosed subject matter, an inter-frame quality evaluation process is now described which implements a temporal consistency quality measure. For convenience, and further by way of example, the herein below description is made with reference to one possible configuration of the device for controlling a compression of a video frame, wherein an inter-wise quality evaluation module 90 is configured to operate in the inter-frame or in the inter-tile domain to provide an inter-frame quality score, or an inter-tile quality score that can be used to compute an inter-frame quality score. In yet further examples of the presently disclosed subject matter, the inter-wise quality evaluation module 90 can operate at an inter-sub-tile domain to provide an inter-sub-tile quality score that can be used to computer an inter-tile quality score and an inter-frame quality score, as will be described below.

Still further by way of example, in the description below, the inter-wise quality evaluation module 90 includes a temporal consistency evaluation module 92 that is configured to implement the temporal consistency quality measure which can be used to calculate the inter-frame quality score, or the inter-tile quality score (which can is used to calculate the inter-frame quality score) or the inter-sub-tile quality score. Similarly, according to examples of the presently disclosed subject matter, the inter-frame quality score computation can include at least a temporal consistency quality measure computation. The temporal consistency quality measure computation that can be implemented by the temporal consistency evaluation module 92 is now described by way of example.

Still further by way of example, computing an inter-frame quality score can be based on two difference values: the first difference value is based on a pixel-wise difference between the current input frame 112 and the preceding input frame 122, and the second difference value is based on a pixel wise difference between the current candidate compressed frame 114 and the preceding compressed frame 124.

According to examples of the presently disclosed subject matter, the device for controlling a compression of a video frame 100 can have an inter-wise quality evaluation module 90. The inter-wise quality evaluation module 90 can be configured to operate in the inter-frame or in the inter-tile domain. The inter-wise quality evaluation module 90 can include a temporal consistency evaluation module 92 that is configured to evaluate a temporal consistency of the current candidate compressed frame. As will be described below, in some examples of the presently disclosed subject matter, the temporal consistency evaluation module 92 can be configured to implement the temporal consistency quality measure at a per-tile level, computing a temporal consistency score for each one of a plurality of tiles of a current candidate compressed frame, and in further examples of the presently disclosed subject matter, the temporal consistency evaluation module 92 can be configured to implement the temporal consistency quality measure at a per sub-tile level, computing a temporal consistency score for each one of a plurality of sub-tiles which are part of one of a plurality of tiles of a current candidate compressed frame. The plurality of temporal consistency sub-tile scores and/or the plurality of temporal consistency tile scores can be combined to provide a corresponding temporal consistency tile score and/or a temporal consistency frame score, respectively.

In some examples of the presently disclosed subject matter, for a given current candidate compressed frame 114, the temporal consistency evaluation module 92 can receive as input a group of frames consisting of: a current input frame 112, a preceding input frame 122, a current candidate compressed frame 114 and a preceding compressed frame 124, and the temporal consistency quality measure can be computed based on the complete frames in the group.

For convenience the above four frames are referred to herein as "the group of frames" or as "the frames group". It would be appreciated that a group of frame can consist of any (even) number from four and above. The group can include six or more frames, when the temporal consistency is evaluated based on a comparison of each of the current candidate compressed frame and the current input frame to two or more preceding compressed frame and preceding input frames, respectively.

Further by way of convenience, a set of tiles that is comprised of a corresponding tile from each frame in a group of frames (four or more tiles in total) is referred to herein as "the group of tiles" or as "the tiles group", and a set of sub-tiles that is comprised of a corresponding sub-tile from each tile in a group of tiles is referred to herein as a "the group of sub-tiles" or as "the sub-tiles group".

Each tile group can be associated with a given area of the respective frames, and each sub-tile group can be associated with a given area of the respective tiles, and with a given area of the respective frames.

It should be appreciated that according to examples of the presently disclosed subject matter, in a group of frames/tiles/sub-tiles, the preceding frames/tiles/sub-tiles can include more than two frames/tiles/sub-tiles (the two frames/tiles/sub-tiles being the corresponding preceding compressed frame/tile/sub-tile and the corresponding preceding input frame/tile/sub-tile).

As mentioned above, by way of example, the tiles can be generated by a partitioning module 60 that is implemented as part of the compression quality evaluation module 50, and the tile quality scores can be pooled by a score pooling module 70 which can also be implemented as part of the compression quality evaluation module 50. The partitioning of tiles into sub-tiles can also be carried out by central components of the device 100, such as by the partitioning module 60, or the partitioning of tiles into sub-tile can be performed by the inter-wise quality evaluation module 90 or by some component that is implemented as part of the inter-wise quality evaluation module 90. In a similar manner, sub-tile score can be processed and pooled by the inter-wise quality evaluation module 90 or by some component that is implemented as part of the inter-wise quality evaluation module 90 or by the score pooling module 70. As mentioned above, a perceptual weighting module 72 can be implemented as part of the score pooling module 70 and can be used to provide more or less weight to certain tiles or areas of the frame, as was described above.

According to examples of the presently disclosed subject matter, the compression quality evaluation module can also include a pixel difference distribution factoring module 74 that is configured to correct or implement a factor over the quality score that is computed for a given compressed candidate frame, when the current input frame has certain characteristics or is of a certain type. Further according to examples of the presently disclosed subject matter, the pixel difference distribution factoring module 74 can be configured to implement the correction or factoring in respect of current compressed candidate frames that are characterized by high frequency content that is located in very sparse backgrounds. Further details with regard to the correction or factor that can be applied by the pixel difference distribution factoring module 74 are provided below.

Figure 5:
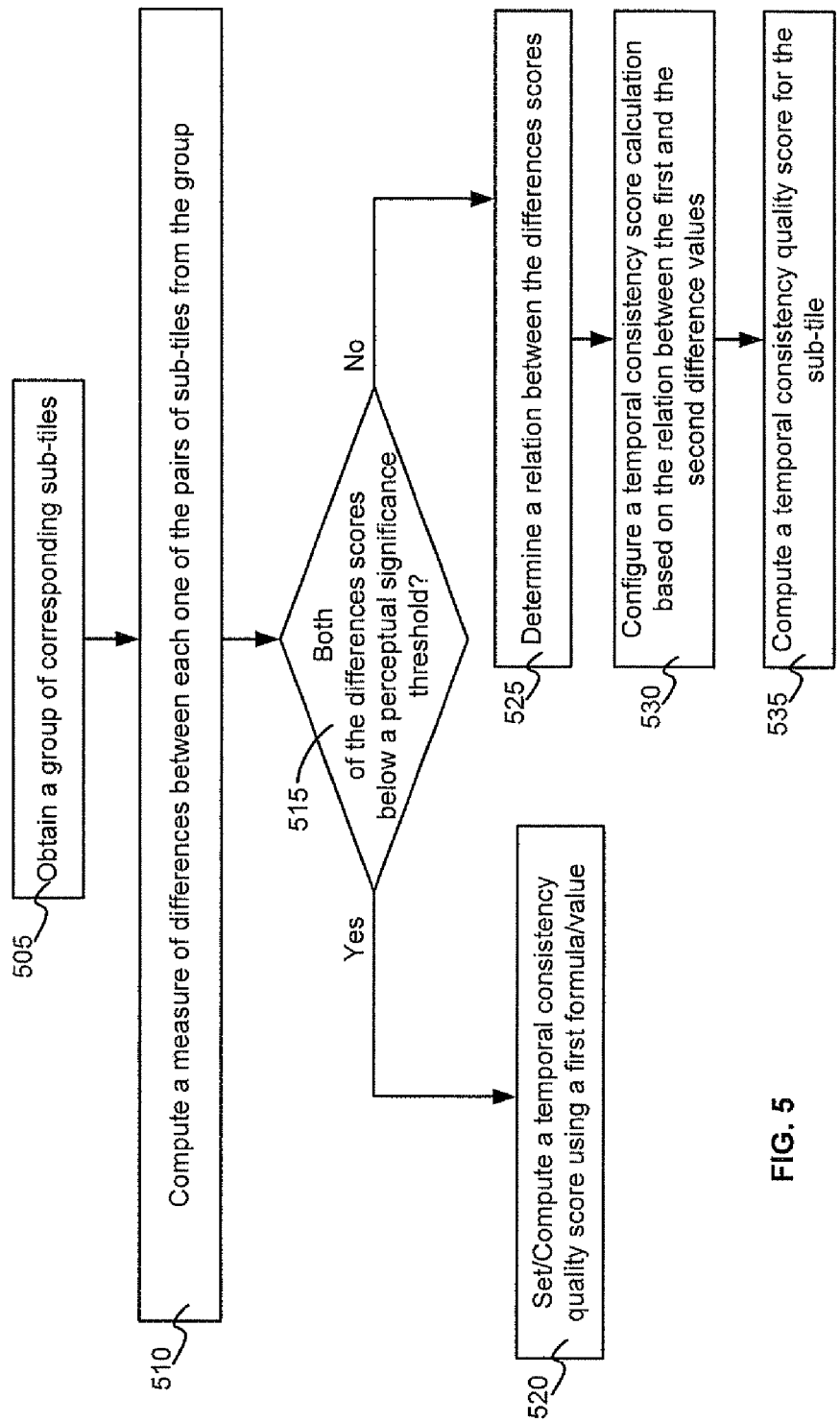
FIG. 5 is a flowchart illustration of a temporal consistency quality measure computation which can be implemented as part of a method of controlling a compression of a video frame, according to examples of the presently disclosed subject matter.

Reference is now made to FIG. 5, which is a flowchart illustration of a temporal consistency quality measure computation which can be implemented as part of a method of controlling a compression of a video frame, according to examples of the presently disclosed subject matter. In FIG. 5, it is shown, by way of non-limiting example, a process of computing a full-reference pixel-domain quality measure that is applied to a sub-tiles group that is provided as input (block 505). By way of example, each tile in a given tile group can be partitioned to provide a plurality of corresponding sub-tiles groups. Further by way of example, each sub-tile in a sub-tiles group can consist of an m×n (e.g., 8×8) pixels block. According to examples of the presently disclosed subject matter, an 8×8 sub-tile pixel block can be used. It would be appreciated that in case the input frame sequence is encoded using the H.264 standard an 8×8 block size may be desirable or advantageous, since the macroblock and motion partitioning schemes supported in H.264 generally provide consistent mode and motion decisions per each aligned 8×8 area.

It would be appreciated that in accordance with examples of the presently disclosed subject matter, the temporal consistency evaluation module 92 can be configured to implement temporal consistency quality measure computation with respect to each one of a plurality of sub-tile groups which are associated with a given tiles group and/or which are associated with a given frames group.

At block 510, according to examples of the presently disclosed subject matter, the temporal consistency evaluation module 92 can be configured to compute a measure of differences between each one of the pairs of sub-tiles from the group. The pairs of sub-tiles from the group of sub-tiles are the corresponding input and compressed sub-tile. For example, if the group of subtitles is comprised of a current candidate compressed sub-tile, a current input sub-tile, a preceding compressed sub-tile and a preceding input sub-tile, the temporal consistency evaluation module 92 can be configured to compute a first measure of differences between the current candidate compressed sub-tile and the preceding compressed sub-tile and a second measure of differences between the current input sub-tile and the preceding input sub-tile.

Further by way of example, the measure of differences calculation can include a calculation of absolute differences ("AD") between pixels in the sub-tile pairs. According to further examples of the presently disclosed subject matter, the consistency evaluation module 92 can be configured to calculate a sum of absolute differences (SAD) over the pixels of the sub-tile pairs (e.g., over a m×n pixel block). It would be appreciated that the AD or SAD computation yields two (or more) differences scores (AD or SAD scores) which correspond to the respective sub-tile pairs.

According to examples of the presently disclosed subject matter, the results of the differences scores received from the calculation in block 510 can be evaluated by the temporal consistency evaluation module 92 to determine whether both the differences scores are below a perceptual significance threshold (block 515). According to examples of the presently disclosed subject matter, the proposed temporal consistency computation can involve a computation of a relation among the results of the differences scores. In further examples of the presently disclosed subject matter, the proposed temporal consistency computation can involve a computation of a ratio among the results of the differences scores. It would be appreciated that a relation or a ratio computation can highly sensitive to differences score which are lower than a certain threshold (which is significantly below 1). By way of non-limiting example, the significant threshold used in block 515 can be in the order of 0.25 for SAD values.

According to examples of the presently disclosed subject matter, in case at block 515 it is determined that all (e.g., both) of the differences scores are below the perceptual significance threshold, the temporal consistency score for the sub-tile can be set to a predefined value. According to further examples of the presently disclosed subject matter, in case at block 515 it is determined that all (e.g., both) of the differences scores are below the perceptual significance threshold, the temporal consistency score for the sub-tile group (or for the corresponding current candidate compressed sub-tile) can be determined according to a first formula (block 520) which can be implemented, for example by the temporal consistency evaluation module 92, for computing the temporal consistency score when the differences scores are both below the significant threshold.

Further according to examples of the presently disclosed subject matter, in case at block 515 it is determined that at least one of the differences scores is above the perceptual significance threshold, a relation between the difference scores can be determined (block 525), and the temporal consistency score calculation can be configured according to the relation between the differences scores (block 530). Still further according to examples of the presently disclosed subject matter, once the relation between the differences score is determined and the temporal consistency score calculation is configured accordingly, a temporal consistency score can be calculated for the sub-tile group (or for the corresponding current candidate compressed sub-tile) according to the configuration that was selected (block 535).

There is now provided by way of example a description of a possible temporal consistency score computation process for a given group of sub-tiles. According to an example of the presently disclosed subject matter, the temporal consistency score calculation can be configured according to both the absolute values of the difference measures for each sub-tiles pair, as well as according to a relation between these values. For example, if the difference value which corresponds to the difference between the current input sub-tile and the preceding input sub-tile is determined to be below a significance threshold, but the difference value which corresponds to the difference between the current candidate compressed sub-tile and the preceding compressed sub-tile is above the significance threshold, the temporal consistency score calculation can be configured such that the temporal consistency score is inversely dependant on the difference value which corresponds to the difference between the current candidate compressed sub-tile and the preceding compressed subtle. Whereas if both of the differences values set forth above exceed the significance threshold, then the temporal consistency score can be otherwise configured. According to examples of the presently disclosed subject matter, when both of the differences values exceed the significance threshold, the temporal consistency score configuration can depend on the relative size of the differences values.

Increased temporal variation, i.e., where the difference value between the compressed sub-tiles (current candidate and preceding compressed) indicates more temporal variation than the corresponding input sub-tiles, is perceptually disturbing, and in particular is more perceptually disturbing than the case of decreased temporal variation, where the temporal variation is reduced after recompression or other processing. Accordingly in some examples of the presently disclosed subject matter, the temporal consistency calculation can be configured such that the penalty increases, or the obtained score is decreased, for the case of increased temporal variation. Thus the temporal consistency score calculation can be configured differently depending on which of the two differences scores is larger.

Furthermore, according to examples of the presently disclosed subject matter, if the differences score for the pair of compressed sub-tiles is larger than the differences score for the pair of input sub-tiles, the quality score calculation can have a non-linear relation with the ratio of the two differences scores, whereas if the differences score for the pair of input sub-tiles is larger than the differences score for the pair of compressed sub-tiles, the quality score calculation can be derived via a linear relation.

A non-limiting example of the configuration described above can be implemented as follows:

If both the differences scores for both the input sub-tile pair and the compressed sub-tile pair are below a significance threshold (for example the significance threshold can be 0.25): set the score according to 1.

According to examples of the presently disclosed subject matter, rather than set the temporal consistency score to 1 when the differences (e.g. SAD) values are both below the significance threshold, the temporal consistency score can instead be calculated essentially according to the following formula:

$$SAD_r = 1 - |SAD_{org} - SAD_{cmp}| \quad \text{Formula (4)}$$

SADr is the sub-tile temporal consistency score, SADorg is the first difference value calculated for the input sub-tile pair, SADcmp is the second difference value calculated for the compressed sub-tile pair. In addition, in case Formula (4) is used, a clipping of the obtained temporal consistency score can be implemented, and the clipping can be applied according to the tile maximum luminance value as follows:

$$maxCF_t = \begin{cases} 0.1 & maxV \geq 128 \\ 0.1 + 0.9 \cdot \left[\dfrac{128 - maxV}{128}\right] & \text{else} \end{cases} \quad \text{Formula (5)}$$

$$S_{TC} = \min(1, \max(maxCF_t, \sqrt{\text{mean}(SAD_r)})).$$

where, maxV is the maximum luminance value of the TILE, $maxCF_t$ is a value used to clip the temporal consistency score so that it does not drop below this value, $SAD_r$ is the per sub-tile temporal consistency score abs $S_{tc}$ is the temporal consistency tile score. It would be appreciated that Formula (5) can be used, since the use of Formula (4) makes the temporal score over-sensitive to substantially small changes in dark frames, and Formula (5) is intended to compensate for this over-sensitivity.

If only the difference score for the input sub-tiles pair is below a significance threshold, configure the temporal consistency score calculation to depend on an inverse of the differences value of the compressed sub-tiles pair. For example the following expression can be used:

$$SAD_r = \dfrac{0.25}{SAD_{cmp}},$$

where $SAD_r$ is the sub-tile temporal consistency score and SADcmp is the second difference value calculated for the compressed sub-tile pair If both differences scores exceed the significance threshold, configure the temporal consistency score calculation to depend on a ratio where the denominator is the larger of the two differences values and the numerator is the smaller of the two differences value, and the ratio can be taken to a power of alpha, where alpha depends on which of the two differences values is larger. (for example alpha=1 for decreased temporal variation, and alpha=2 for increased temporal variation).

In both these cases (if only the difference score for the input sub-tiles pair is below a significance threshold and if both differences scores exceed the significance threshold), the score of the temporal component can be computed according to the expression $S_{TC} = \min(1, \sqrt{\text{mean}(SAD_r)})$.

According to examples of the presently disclosed subject matter, the temporal consistency calculation process can include a frame score normalization measure that can be applied to the overall frame quality score. According to examples of the presently disclosed subject matter, the frame score normalization measure can be implemented in order to allow the frame quality score calculation process to operate well with respect to different types of frames, including for example, the first frame in a sequence. Referring the first frame in a sequence example, it would be appreciated that for this frame a temporal consistency score cannot be calculated (for example, it can be set to 1). For scene changes (e.g., the first frame of a new scene) a temporal consistency score of around 1 can also be expected. In some examples of the presently disclosed subject matter, the normalization factor can be applied in order to equalize the score for all frame types—both with "measurable" temporal consistency and without.

According to examples of the presently disclosed subject matter, a frame score normalization measure can be configured to implement the normalization according to a predefined normalization factor. According to still further examples of the presently disclosed subject matter, the frame score normalization measure can have a plurality of configurations, and can use a plurality of normalization factors, for a respective predefined plurality of frame types. Thus for example the frame score normalization measure can be configured to use a first normalization factor for a first frame type and a second normalization factor for a second frame type. According to yet further examples, the normalization factor can be set or modified according to a predefined characteristic of a given current input frame, or according to a predefined characteristic of a preceding input frame. Examples of types of frames for which the normalization factor can be modified can include INTRA coded (I) frames vs. INTER coded (P) frames for instance, the first frame in the clip as opposed to all the frames that follow. An example of the normalization is provided below.

According to examples of the presently disclosed subject matter, the frame score normalization measure can use an equalization factor, EqFact=(approx.)0.95 for the first frame of a scene. The Applicant achieved good results in testing with equalization factor, EqFact=0.95

It would be appreciated that in accordance with examples of the presently disclosed subject matter, with regard to I-frames and in particular scene changes, while the temporal component score may contribute little to assessment of the frame's visual quality, there is no harm in applying it since the SADs in both the original and recompressed clips are very high, thus providing ratios that are close to 1, with the equalization correcting any slight shift that was introduced.

By way of non-limited example, there is provided a description of certain observations by the inventors during the testing of the proposed temporal consistency quality measure. The observations reflect certain parameters and configuration that we considered to be part of examples of the presently disclosed subject matter, but other examples and some results under various circumstances are not necessarily limited to the observations described now. According to examples of the presently disclosed subject matter, the application of the temporal consistency quality measure revealed a generally lower temporal consistency quality value in areas of localized motion such as moving lips and facial gestures, than in the static background areas, as desired.

It should be noted that some examples of the method of controlling a compression of a video frame according to the presently disclosed subject matter, including the implementation of the temporal consistency quality measure computation, are not limited by the example of the inter-wise quality evaluation module 90 and the temporal consistency evaluation module 92 shown in FIG. 1 and described herein.

Having described certain examples of the presently disclosed subject matter which relate to the computation of the inter-frame quality score, there is now provided a description of intra-wise quality measure which can optionally be implemented as part of the computation of the intra-frame quality score, according to examples of the presently disclosed subject matter. As mentioned above, according to examples of the presently disclosed subject matter, the intra-frame quality score computation can include at least a full-reference pixel-domain quality measure computation. The intra-wise quality measures described below can each be implemented as part of the intra-frame quality score computation in addition to the full-reference pixel-domain quality measure computation. Further by way of example, any combination of one or more of the intra-wise quality measures described below can be implemented as part of the intra-frame quality score computation in addition to the full-reference pixel-domain quality measure computation.

According to examples of the presently disclosed subject matter, as part of the intra-frame quality score computation, an added artifactual edges measure can be implemented and a corresponding added artifactual edges score can be calculated. According to examples of the presently disclosed subject matter, the intra-wise quality evaluation module 120 can include an added artifactual edges evaluation module 130 that is adapted to process a pair of frames (a current input frame and a current candidate compressed frame) for determining an extent of added artifactual edges in the current candidate compressed frame (compared to the corresponding current input frame), and to provide a score which quantifies the extent of added artifactual edges.

According to examples of the presently disclosed subject matter, the added artifactual edges measure score can be based on quantifying an extent of added artifactual edges along a video encoding coding block boundary of the current candidate compressed frame 114 relative to the current input frame 112. According to further examples of the presently disclosed subject matter, the extent of added artifactual edges can be determined according to a behavior of pixel values across video coding block boundaries in relation to a behavior of pixel values on either side of respective video coding block boundaries. According to still further examples of the presently disclosed subject matter, the extent of added artifactual edges can be determined with respect to a difference frame which corresponds to the (pixel-wise) differences between the current candidate compressed frame 114 and the current input frame 112, and according to a behavior of pixel values across video coding block boundaries in the corresponding difference frame in relation to a behavior of pixel values on either side of respective video coding block boundaries of the difference frame.

According to still further examples of the presently disclosed subject matter, added artifactual edges measure can include normalizing the added artifactual edges score according to an artifactual edges normalization factor that is based on the brightness parameter value and on a distribution of the extent of added artifactual edges. In some examples, the normalization of the added artifactual edges score can be carried out by an artifactual edges normalization module 132 that can be implemented as part of the added artifactual edges evaluation module 130.

Further details with respect to the added artifactual edges measure are now provided by way of example. According to some examples of the presently disclosed subject matter, as with the other quality measures described herein, the frame pair can be partitioned into a plurality of tile pairs. For a given tile pair, a difference tile can be computed and the added artifactual edges quality measure can be applied to difference tile. Each tile pair can be associated with a respective frame pair, and for each frame pair a plurality of tile added artifactual edges scores can be determined. For each tile pair the extent of added artifactual edges can be determined according to a behavior of pixel values across video coding block boundaries in the corresponding difference tile in relation to a behavior of pixel values on either side of respective video coding block boundaries of the difference tile.

According to examples of the presently disclosed subject matter, calculating the extent of added artifactual edges for a given tile pair may include identifying horizontal and vertical block boundaries in the difference tile. Further by way of example, as part of the calculation of the extent of added artifactual edges, the blocks correspond to the fxg blocks that were used by the encoder when encoding the compressed frame (e.g., the current candidate compressed frame). Thus for example, for H.264 encoding, the block size corresponds to the 16×16 H.264 macroblock size.

Further by way of example, for a given block boundary (horizontal or vertical boundary) an inter-block change or a gradient across the block's border can be evaluated, and a local intra-block gradient within the block(s) on either side of the block's border can be evaluated. For example, evaluating a local intra-block gradient within the block(s) on either side of the block's border can include evaluating the difference between say the value on the immediate left of the block border and the pixel to its left. According to examples of the presently disclosed subject matter, the inter-block change or a gradient can be computed based on the pixel values of the pixels on either side of the border (unless this is a boundary block). According to further examples of the presently disclosed subject matter, the local intra-block gradient is computed based on the pixel values of the pixels which are nearest to the block border in the blocks on either side of the border.

According to examples of the presently disclosed subject matter, further as part of calculating the extent of added artifactual edges for a given tile pair, the inter-block change value can be compared to the respective local intra-block values. According to examples of the presently disclosed subject matter, the comparison between the inter-block change value and the respective local intra-block values can be performed by scanning the difference image tile, along the macroblock grid, e.g. 16×16, and for each point on a horizontal or vertical block edge checking for the presence of an added artifactual edge. The term "artifactual edge" relates to an edge, —i.e. a local gradient, that is 'significantly' larger than the gradient on either of its sides (e.g., the difference is above a certain threshold), which didn't exist in the corresponding input frame.

Reference is now made by way of example, to FIG. 6, which is a graphical illustration of the pixel values of two blocks sharing a common (vertical) block boundary. For illustration, a computation that involves a comparison of the inter-block gradient value with respective intra-block gradient values is now described with reference to the blocks shown in FIG. 6, For a vertical edge between the A and B blocks, the computation of a degree of added artifactual edge between A1,16 and B1,1 can include computing a ratio between the change in the pixels in the difference images across the block border, divided by the average change in the pixels on either side of the block border. According to examples of the presently disclosed subject matter, in order to avoid division by zero, a small constant (e.g., 0.0001) can added to the denominator. This is formulated in Formula (6):

$$\frac{|B_{1,1} - A_{1,16}|}{\frac{1}{2}[(|B_{1,2} - B_{1,1}|) + (|A_{1,16} - A_{1,15}|) + 0.0001]} \quad \text{Formula (6)}$$

It would be appreciated that the computation in Formula (6) is provided by way of example, and the inter-block and intra-block gradient values can be computed using any number of pixels and not just the pixels on either side of the block edge and/or the two pixels nearest to the block edge, respectively.

According to examples of the presently disclosed subject matter, a soft thresholding of the added artifactual edges value can be implemented as part of the calculation of the added artifactual edges score. Further by way of example, soft thresholding can enable recognition of a range of blockiness artifacts. Thus, according to examples of the presently disclosed subject matter, given a lower and an upper threshold values: $THR\_L_{AAE}$ and $THR\_H_{AAE}$, the added artifactual edges scores map, a score map containing values in the range [0, 1] for each horizontal and vertical border point, can be created as follows:

If the added artifactual edges value, as calculated in Formula (6), is below the lower threshold, $THR\_L_{AAE}$ the added artifactual edges (AAE) score is set to 0 (no artifact).

If the added artifactual edges value lies between the lower threshold $THR\_L_{AAE}$ and the higher threshold $THR\_H_{AAE}$, the added artifactual edges score can be set to a value in the range [0,1] which is linearly proportional to the extent of added artifactual edges, i.e.:

$$\frac{AAE - THR\_L_{AAE}}{THR\_H_{AAE} - THR\_L_{AAE}} \quad \text{Formula (7)}$$

If the added artifactual edges value exceeds the higher threshold $THR\_H_{AAE}$ the added artifactual edges score is set to 1.

Figure 7:
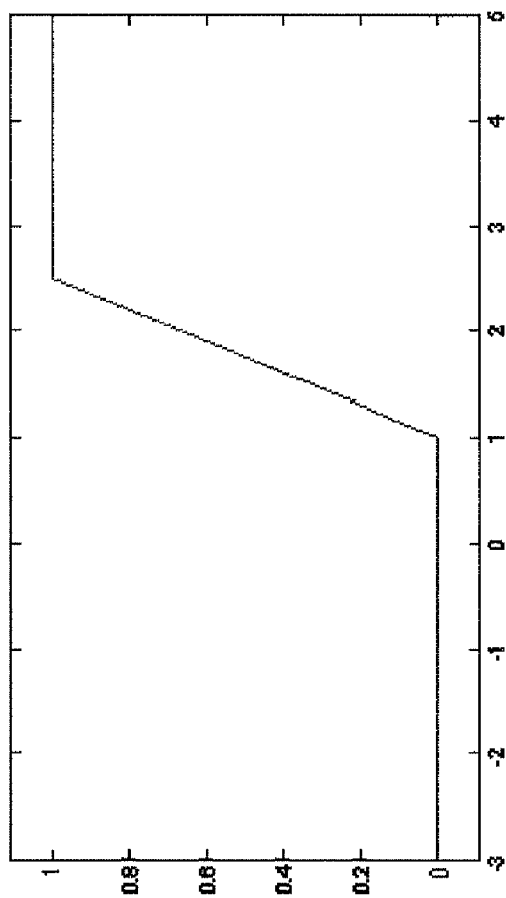
FIG. 7 is a schematic illustration of a thresholding function which can be used as part an added artifactual edges measure that can be used as part of a method of controlling a compression of a video frame, according to some examples of the presently disclosed subject matter.

As an example, for lower and upper threshold values of 2 and 5 respectively, the thresholding function shown in FIG. 7 can be obtained, where the X axis denotes added artifactual edges values, and the Y axis denotes resulting local score values. It would be noted that to save calculations half the ratio described Eq. (4) can be calculated and thresholds of 2/2 and 5/2 can be used.

According to examples of the presently disclosed subject matter, the added artifactual edges score, denoted here by $S_{AAE}$, can be calculated as an average over the added artifactual edges scores map that include the added artifactual edges score at each edge point. By way of example, Formula (8) below provides an example of a computation that can be used for calculating the added artifactual edges score from the artifactual edges scores map. In Formula (8) P and Q are the dimensions of the score map, i.e. the number of edge points per row and column respectively.

$$S_{AAE} = 1 - \frac{1}{P \cdot Q} \sum_{p=0}^{P-1} \sum_{q=0}^{Q-1} AAESmap(p, q) \quad \text{Formula (8)}$$

It would be appreciated that while the computation represented by Formula (8) can provide a good indication as to presence of perceptually visible edges, further processing may be required in order to quantify the extent of degradation. For example, very disturbing visible edges, where the block on either side of the edge is 'flat' and there is a change at the block edge, can receive according to Formula (8) an added artifactual edges score of 1, which is the score that a much less disturbing blockiness artifact which also exceeds the higher threshold $THR\_H_{AAE}$ may yield.

Thus, according to examples of the presently disclosed subject matter, a penalty can be added to the added artifactual edges score computation. Further by way of example, the penalty can be applied for the case of added artifactual edges values which are larger than a qualitative threshold, and whose number is larger than a quantity threshold.

Still further according to examples of the presently disclosed subject matter, a further measure can be implemented to control the application of the penalty, to avoid, for example, over-penalizing of certain tiles. According to examples of the presently disclosed subject matter, the penalty can be applied to tiles that are both dark (e.g., maxV<<128) and have 'problematic' distributions such as 'titles' frames, may be penalized twice and thus have low scores even when their quality is very high. Further by way of example, the penalty control measure can be configured to control the application of the penalty with respect to blocks that are both particularly dark and also have a particularly high value of added artifactual edges.

Therefore, the allowed range for the added artifactual edges score correction factor can be set, based on maxV, which is a maximum luma value in the evaluated tile. This maxV value that can be used for setting the allowed range for the added artifactual edges score correction factor can be the same value as the maximum luma value which was already described above in connection with the description of Formula (2), and in this case, the value in Formula (2) can be used in the current computation as well. According to examples of the presently disclosed subject matter, the allowed range for the added artifactual edges score correction factor can be determined, for example, using the following Formula (9):

$$AAE\_CF_{max} = \begin{cases} 0.65 & \maxV \geq 128 \\ & \text{(no 'darkness correction')} \\ 0.65 + 0.35 \cdot \left(\frac{128 - \maxV}{128}\right) & \text{otherwise} \end{cases}$$ Formula (9)

According to further examples of the presently disclosed subject matter, assuming Formula (9) is used to control allowed range for the added artifactual edges score correction factor, the correction factor can be calculated, as an example, using Formula (10):

$$AAE\_CF = \max\left(AAE\_CF_{max}, \min\left(1, 0.25 + \frac{1000 \cdot P \cdot Q}{\sum_{p=0}^{P-1} \sum_{q=0}^{Q-1} AAESmap(p, q)}\right)\right)$$ Formula (10)

It would be appreciated that if the added artifactual edges value is very high, added artifactual edges score map values of ~1000 can result, and therefore a correction factor which is below 1 can be obtained.

Following the computation of the correction factor, the added artifactual edges score component can be corrected using the calculated correction factor, for example, as follows:

$$S_{AAE} = S_{AAE} \times AAE\_CF$$ Formula (11)

In this example, the added artifactual edges score is in the range [0,1] with 1 indicating no added artifactual edges in the target image tile, and the lower the value—towards 0, the more added artifactual edges have been found to be present.

According to examples of the presently disclosed subject matter, as part of the intra-frame quality score computation, a texture distortion measure can be implemented and a texture distortion score can be calculated. According to examples of the presently disclosed subject matter, the texture distortion measure score can be based on texture values associated with the current candidate compressed frame 114 relative to the current input frame 112.

According to examples of the presently disclosed subject matter, the texture distortion measure can be based on relations between texture values in the current candidate compressed frame 114 and in the corresponding current input frame 112. According to examples of the presently disclosed subject matter, the intra-wise quality evaluation module 120 can include a texture distortion evaluation module 140 that is adapted to process a pair of frames (a current input frame and a current candidate compressed frame) for determining an extent of texture distortion in the current candidate compressed frame (compared to the corresponding current input frame), and to provide a score which quantifies the extent of texture distortion. According to further examples of the presently disclosed subject matter, each texture value corresponds to a variance of pixel values within each one of a plurality of predefined pixel groups in the candidate compressed frame 114 and in each respective pixel group in the corresponding current input frame 112.

According to further examples of the presently disclosed subject matter, the texture distortion measure can include implementing texture distortion sensitivity thresholds. Further by way of example, the texture distortion measure can include applying texture distortion sensitivity thresholds to the relations between texture values in the current input frame and in the corresponding candidate compressed frame. Still further by way of example, the texture distortion sensitivity thresholds can be configured to provide a non-linear texture distortion score mapping that is based on the texture distortion sensitivity thresholds. Further by way of example, one or more of the texture distortion sensitivity thresholds can be adapted according to pixel-wise differences. Still further by way of example, the pixel-wise differences that are used for determining or adapting one or more of the texture distortion sensitivity thresholds can be based on the pixel-wise difference score that was calculated for the respective tile as a result of the pixel-wise quality evaluation process that was described above, for example with reference to FIGS. 2-4. It would be appreciated that using the same pixel-wise difference score that was calculated for the respective tile as a result of the pixel-wise quality evaluation process for setting the thresholds for the entire tile as part of the texture distortion evaluation process for the plurality of predefined pixel groups.

According to examples of the presently disclosed subject matter, the texture distortion evaluation module 140 can include a texture distortions thresholds configurator 142 that is adapted to determine or adapt one or more of texture distortion sensitivity thresholds that are to be used as part of the texture distortion evaluation process. By way of example, the texture distortions thresholds configurator 142 can be configured to determine the texture distortions thresholds that are to be used according a result of the pixel-wise quality evaluation process, as mentioned above.

Further details with respect to the texture distortion measure are now provided by way of example. According to some examples of the presently disclosed subject matter, as with the other quality measures described herein, the frame pair can be partitioned into a plurality of tile pairs. According to examples of the presently disclosed subject matter, as part of the implementation of the texture distortion measure a tile pair can be further partitioned into a plurality of sub-tiles. A sub-tile can have a dimension of M×N. For instance, sub-tiles of size 4×4 can be used.

According to examples of the presently disclosed subject matter, a mean pixel value can be computed for a given sub-tile pair. For illustration, $I_R(m,n)$ and $I_T(m,n)$ are used, where $I_T$ is associated with a sub-tile from the current candidate compressed frame and $I_R$ is associated with a corresponding sub-tile from the current input frame, and the mean pixel values computation is represented, as an example, by Formula (12):

$$MEAN_I(m, n) = \frac{1}{M \cdot N} \sum_{k=k_m}^{k_m+M} \sum_{l=l_n}^{l_n+N} I(k, l)$$ Formula (12)

Then, corresponding sub-tile pair variance values are computed, for example using the computation represented by Formula (13):

$$VAR_I(m, n) = \frac{1}{M \cdot N} \sum_{k=k_m}^{k_m+M} \sum_{l=l_n}^{l_n+N} |I(k, l) - MEAN_I(m, n)|$$ Formula (13)

The sub-tile pair variance values computation can be followed by a calculation of the variance ratio, and corresponding 1's compliment. This computation is represented by Formula (14):

$$VarR_I(m, n) = \frac{VAR_{I_R}(m, n) + C}{VAR_{I_T}(m, n) + C};$$

$$VarR_I 1c = 1 - VarR_I(m, n)$$

Formula (14)

Where C is a constant that is used to avoid division by 0. For example, C=2. It would be appreciated, that as a general rule, the larger C is, the more slight variance changes around 0 are ignored.

Now, for each sub-tile pair a local texture distortion score can calculated as a function of the variance ratios, for example using the computation represented, as an example, by Formula (15):

$$S_{TD}(m, n) = \begin{cases} 0 & \text{if } (VarR_I > THR_{TD}H) \text{ or } \\ & (VarR_I < THR_{TD}L) \\ 1 & |VarR_I 1c| < THR_{TD}O \\ \left(1 - \frac{VarR_I 1c - THR_{ID}O}{1 - THR_{TD}L - VarR_I 1c}\right)^2 & VarR_I 1c > 0 \\ \left(1 + \frac{VarR_I 1c + THR_{ID}O}{THR_{ID}H - 1 - VarR_I 1c}\right)^2 & VarR_I 1c <= 0 \end{cases}$$

Formula (15)

Where the constants defining the high and low thresholds denoted by THRtdL and THRtdH for the ratio, and the allowed offset or deviation from ratio=1 denoted by THRtdO are set according to the previously calculated pixel-wise difference score. This computation is represented, as an example, by Formula (16):

if ($S_{PWD}$>0.85)

$THR_{TD}H=5; THR_{TD}L=0.2; THR_{TD}O=0.2;$ else $THR_{TD}H=1.4; THR_{TD}L=0.6; THR_{TD}O=0.1$ Formula (16)

Figure 8:
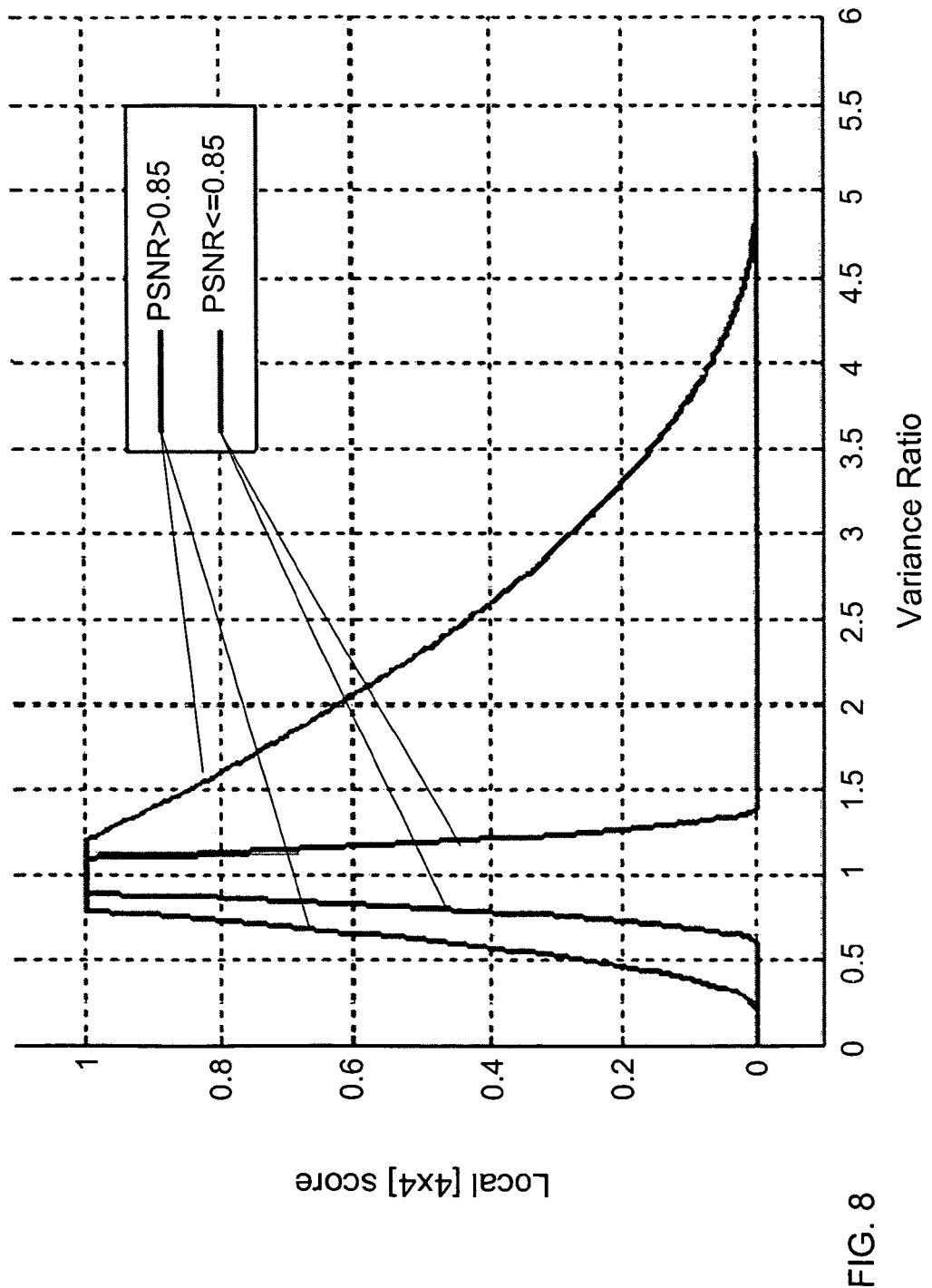
FIG. 8 is a schematic illustration of a thresholding function which can be implemented as part of a texture distortion measure that can be used as part of a method of controlling a compression of a video frame, according to some examples of the presently disclosed subject matter.

According to examples of the presently disclosed subject matter, the computation represented by Formula (16) can result in a thresholding function. A graphical illustration of an example of a thresholding function which can be implemented as part of the texture distortion measure is presented in FIG. 8.

The texture distortion measure computation, a computation of an overall texture distortion score can be computed by averaging the values of $S_{TD}$ from Formula (15) over all M×N blocks within the W×H tile pair. This computation is represented, as an example, by Formula (17):

$$S_{TD} = \frac{M*N}{W*H} \sum_{m=1}^{W/M} \sum_{n=1}^{H/N} S_{TD}(m, n)$$

Formula (17)

Further as part of the texture distortion measure computation a correction can be applied to the overall texture distortion score. According to examples of the presently disclosed subject matter, the correction factor computation can be carried out by a texture distortions normalization module 144 that is implemented as part of the texture distortion evaluation module 140. According to examples of the presently disclosed subject matter, the correction that is applied to the overall texture distortion score can be configured to emphasize a disturbing artifact that is associated with a consistent texture loss over large parts of a tile. Further by way of example, the correction can be configured according to a correction factor that is based on a ratio of an average variance in the current input tile and the current candidate compressed tile. An example of a computation of a correction factor that can be used to configure a correction that can be implemented as part of a texture distortion measure computation is provided by Formulae (18) and (19):

$$VAR_I avg = \frac{1}{M*N} \sum_m \sum_n VAR_I(m, n);$$

Formula (18)

$$VARavgR = \frac{VAR_{I_R} avg}{VAR_{I_T} avg}$$

$$TD\_CF = \begin{cases} 1 & VARavgR < 1.5 \\ \max\left(TD\_CF_{max}, \frac{2}{3} VARavgR\right) & \text{otherwise} \end{cases}$$

Formula (19)

According to examples of the presently disclosed subject matter, the texture distortion measure computation can include a threshold $TD\_CF_{max}$ that is implemented as part of the correction factor computation to prevent over-correction of a current candidate compressed tile that suffers from multiple disturbing artifacts. Further by way of example, $TD\_CF_{max}$ can be determined according to or in a manner which corresponds to the computations of the correction factors for the pixel-wise difference measure and the added artifactual edges measure. For example, $TD\_CF_{max}$ can be determined according to Formula (20):

Formula (20)

$$TD\_CF_{max} = \begin{cases} 0.25 & \max V \geq 128 \text{ and } \\ & AAE\_CF == 1 \\ 0.25 + (1 - AAE\_CF) & \max V \geq 128 \\ 0.25 + 0.25 \cdot \left(\frac{128 - \max V}{128}\right) + (1 - AAE\_CF) & \text{otherwise} \end{cases}$$

As will be described further below, the texture distortion score can be combined into the overall compressed candidate frame/tile quality score with an exponent of 0.5, so when limiting the correction factor TD_CF to 0.25, the actual correction factor of the overall tile compressed candidate frame/tile quality score can be limited to sqrt(0.25)= 0.5. As a final stage of the texture distortion measure computation, the overall texture distortion score can be corrected, for example, according to the computation represented by Formula (21):

$$S_{TD} = S_{TD} \times TD\_CF$$

Formula (21)

The result of Formula (21) is a score in the range [0,1] with 1 indicating no visible texture distortion in the target image tile.

According to examples of the presently disclosed subject matter, as part of the intra-frame quality score computation, an edge loss measure can be implemented and an edge loss score can be calculated. The computation of the edge loss measure can be carried out by an edge loss evaluation module 150 that is implemented as part of the intra-wise quality evaluation module 80. According to examples of the presently disclosed subject matter, the edge loss score computation can include obtaining an edge map corresponding to the current input frame and computing the edge loss score based on the edge map corresponding to the current input frame. For example, the edge loss score computation can include: obtaining an edge map corresponding to the current input frame, computing for each edge pixel in the current input frame an edge strength score based on a deviation between a value of an edge pixel and one or more pixels in the proximity of the edge pixel, computing for each corresponding pixel in the candidate compressed frame an edge strength score based on a deviation between a value of the corresponding pixel and one or more pixels in the proximity of the corresponding pixel, and the edge loss score is calculated based on a relation among the edge strength score of the edge pixel and the edge strength score of the corresponding pixel.

According to further examples of the presently disclosed subject matter, the edge loss score computation can include obtaining an edge map corresponding to the current input frame and obtaining an edge map corresponding to the candidate compressed frame. For example, the edge loss score computation can include: obtaining an edge map corresponding to the current input frame, obtaining an edge map corresponding to the candidate compressed frame and calculating an edge loss score based on a loss of edge pixels according to a difference between the edge map corresponding to the current input frame and the edge map corresponding to the candidate compressed frame.

Further details with respect to the edge loss measure are now provided by way of example. According to some examples of the presently disclosed subject matter, as with the other quality measures described herein, the frame pair can be partitioned into a plurality of tile pairs, and the edge loss measure can be applied to the tile pairs, and edge loss scores for the tiles that are associated with a given frame can be pooled together.

According to examples of the presently disclosed subject matter, the edge loss measure can include a computation of a binary edge map for each current input frame or for each tile of a current input frame. Further by way of example, the edge map computation can be implemented as a preliminary, pre-processing stage. Still further by way of example, the binary edge map is generated by providing a value of 1 in the edge map for an edge pixel. Yet further by way of example, an edge detection algorithm such as Canny edge detection, Sobel edge detection, log-laplacian edge detection, Prewitt Roberts edge detection or any other edge detection algorithm can be used.

According to examples of the presently disclosed subject matter, in addition to providing in the edge map a binary indication for an edge pixel, for each edge pixel the edge 'direction' can be determined. Further by way of example, determining a direction of an edge pixel can include the following: assuming an edge at location $\{i, j\}$, calculating an absolute difference between the pixel value at $\{i, j\}$ and each of the surrounding pixels (e.g., eight surrounding pixels), comparing the absolute differences, and setting $ED_{org}(i,j)$ according to a location of the pixel that produced the largest absolute difference with the pixel at $\{i, j\}$. An example of a schematic enumeration of the pixels surrounding the pixel at $\{i, j\}$ is illustrated in FIG. 9A, which in combination with the schematic illustration of the respective pixel values (edge pixel is bolded) in FIG. 9B and corresponding absolute differences values (maximum value is bolded) in FIG. 9C demonstrate the case for a diagonal edge, where $ED_{org}(i,j)=3$.

According to examples of the presently disclosed subject matter, in one implementation of the edge loss measure computation, in order to calculate the edge loss score (or ELF), the following data can be obtained:

$F_{cmp}$: The current candidate compressed frame/tile;
$F_{org}$: The current input frame/tile;
$EM_{org}$: A binary edge map corresponding to $F_{org}$.
$ED_{org}$: The "direction" of each edge point, indicated by values in the range 0-7 representing the pixels surrounding the respective edge pixel.

Using the above data, for each tile an edge loss score can be calculated. The edge loss score can be used as an indication of an extent (e.g., a percent) of the edge loss among edge pixels. Edge loss can be defined and can be calculated using the following algorithm:

set $N_e=0$; $N_{elf}=0$; $N_e$ denotes the number of edges and $N_{elf}$ denotes the number of edge loss points for each pixel in the tile, if it is an edge pixel:
set $N_e=N_e+1$;
calculate the edge absolute difference value, where the absolute difference between the edge pixel (the value of the pixel in the frame) and the pixel (in the frame) indicated by the corresponding value in $ED_{org}$, in both the current input tile and in the current candidate compressed tile to obtain $EAD_{org}(i,j)$, $EAD_{cmp}(i,j)$.

In an example according to the pixels block shown in FIGS. 9A-9C, the application of the above algorithm would translate to:

$$EAD_{org}(i,j)=|F_{org}(i,j)-F_{org}(i,j-1))|=101; EAD_{cmp}(i,j)= |F_{cmp}(i,j)-F_{cmp}(i,j-1))|.$$

If $EAD_{cmp}(i,j) \leq \frac{1}{2} * EAD_{org}(i,j)$ then $N_{elf}=N_{elf}+1$     Formula (22).

In yet another example, $N_{elf}$, which denotes the extent of lost edge information for the edge pixels in the tile, can be computed as follows: a per pixel edge loss measure may be calculated by:

$$edgeLossMeasure = \frac{EAD_{cmp}}{EAD_{org} + C} \quad \text{Formula (23)}$$

where C is a small constant to avoid division by 0, for instance C=0.0001.

Then for each edge pixel, $N_{elf}$ is updated as follows: if there is potentially an edge loss as indicated by a predefined edge loss criterion, for instance the edge loss criterion can be edgeLossMeasure≤0.5 or a similar criterion, then: if the edge has been completely eradicated as indicated by a predefined edge eradication criterion, for example the eradication criterion can be $EAD_{cmp}==0$, or a similar criterion, then $N_{elf}$ is computed accumulatively as follows:

$$N_{elf} = \quad \text{Formula (24)}$$
$$N_{elf} + \min\left\{1, 50 \cdot \frac{EAD_{org}}{\max\{\text{edge pixel value, furthest } neight}\right.$$

Otherwise, if edge was only partially lost, then $N_{elf}$ is computed accumulatively as follows:

$$Nelf \quad\quad\quad \text{Formula (25)}$$

This means that for edges that are completely lost, there is a greater leniency if the pixel values are very high (e.g., for bright pixels). Otherwise, the error is directly related to the extent of edge loss rather than always being 1 as in the previous example.

The computation above is carried out for all the edge pixels in the tile. The next computation is applied after having "scanned" all edge pixels in the tile.

If $N_e > 0$, \quad\quad\quad Formula (26)

$$S_{ELF} = \max\left(0.4, 1 - \frac{N_{elf}}{N_e}\right),$$

otherwise:

$$S_{ELF} = 1.$$

In another example the above computation, depicted in Formulae 23-25 can be performed only for certain edge pixels, while excluding other edge pixels. According to examples of the presently disclosed subject matter, the edge pixels selection criterion can be associated with a predefined characteristic (or characteristics) of the found edge in the image. By way of example, the edge score described below can be included in the edge pixels selection criterion, and a threshold can be implemented to determine, according to each edge pixel's edge score, whether to apply the computations associated with Formulae 23-25 mentioned above or not. In a further example, the edge pixels selection criterion can be associated with a measure of the length of the edge, where for pixels that are part of an edge that includes less than a certain (e.g., predefined) number of pixels, the computations associated with Formulae 23-25 can be avoided for the respective edge pixels In yet a further example, the edge pixels selection criterion can be associated with a measure of the "strength" of the edge, which can be measured for example as a function of the numerical absolute difference between pixel values on either side of the edge. The criterion based on "strength" of the edge can include some (e.g., a predefined) threshold, and if the measure of the "strength" of the edge is less than a certain value, the computations associated with Formulae 23-25 can be avoided for the respective edge pixels.

According to examples of the presently disclosed subject matter, the edge loss measure computation can be configured to provide an edge loss score within a limited range. For example, in the above example, the edge loss measure computation is configured to provide an edge loss score in the range [0.4, 1] with 1 indicating no edge loss, and 0.4 indicating severe edge loss. In this example, the score to is limited from below to 0.4 to support of graceful quality degradation, such that even when edges are not preserved well, an overall quality which is not perceptually lossless but still acceptable for some applications can be obtained. It would be appreciated that in further examples of the presently disclosed subject matter the edge loss measure can be configured to include a soft thresholding, which can be implemented as part of the edge loss score computation instead of the hard thresholding described above. By way of example, a soft threshold that is implemented as part of the edge loss measure computation can be configured using 0.5, and lower bound limit.

The inventors discovered that introducing the edge loss score component to the tile score computation (as explained below) can cause an average drop in overall frame quality score by a factor of about 0.9. The drop in overall frame quality score can be a result of multiplying all the previous scores by another component which generally is smaller than 1. The more score components there are the lower the obtained score will be for the same actual quality. Thus, according to examples of the presently disclosed subject matter, in case the edge loss measure is implemented as part of the quality evaluation process, the overall frame quality score can be normalized. For example, the overall frame quality score can be normalized as follows:

$$BBvCQ = \min\left(1, \frac{BBvCQ}{0.9}\right) \quad\quad \text{Formula (27)}$$

Where BBvCQ denotes the overall frame quality score.

Having described examples of the presently disclosed subject matter which relate to the computation of an inter-frame quality measure and examples of an intra-frame quality measures, there is now provided a description of computing a frame quality score for the current candidate compressed frame based on the intra-frame and the inter-frame quality scores. According to examples of the presently disclosed subject matter, the frame quality score that is computed from the intra-frame and the inter-frame quality scores can be evaluated against a quality criterion to determine whether the quality criterion is satisfied or not. In case the quality criterion is not satisfied the compression process can be repeated using an updated quantizer parameter value giving rise to an updated candidate compressed frame. The quality evaluation process described herein, including the computation of the inter-frame quality score and the intra-frame quality score can be repeated for the updated candidate compressed frame, and the updated candidate compressed frame can be evaluated again, until for a certain current candidate compressed frame the quality criterion is met. According to examples of the presently disclosed subject matter, when the quality criterion is met, the compression quality evaluation module can be configured to instruct the encoder to provide the current candidate compressed frame as output.

There is now provided a description of a possible implementation of a computation for pooling or combining the intra-frame and the inter-frame quality scores. As mentioned above, the intra-frame quality score can be associated at least with a pixel-wise difference quality measure. As was also mentioned above, in addition to the pixel-wise quality measure, the intra-frame quality score can optionally also be associated with one or more of the following intra-wise quality measures: an added artifactual edges measure, a texture distortion measure or an edge loss measure. According to examples of the presently disclosed subject matter, the intra-frame quality score need not necessarily be explicitly calculated and the intra-wise quality measure's or measures' score(s) can be fed directly to the pooling function. Further by way of example, the pooling of the scores can take place at the tile level, and the resulting tile scores can be combined to provide the overall frame quality score for the current candidate compressed frame.

According to examples of the presently disclosed subject matter, the pooling function that is used to calculate the overall tile score can include an exponent for each of the tile quality measures that are to be pooled. According to further examples of the presently disclosed subject matter, the exponents can be predefined. For example, a pooling function which can be used to calculate the overall tile score is provided by way of example below as Formula 28:

$$BBvCQ = (S_{PWD})^{\alpha} \cdot (S_{AAE})^{\beta} \cdot (S_{TD})^{\gamma} \cdot (S_{TC})^{\mu} \cdot (S_{ELF})^{\eta} \quad \text{Formula (28)}$$

where BBvCQ denotes the overall tile quality score, $S_{PWD}$ denotes the pixel wise difference score that was calculated for the tile, $S_{AAE}$ represents the added artifactual edges score, $S_{TD}$ represents the texture distortion score, $S_{TC}$ denotes the temporal consistency score, and $S_{ELF}$ denotes the edge loss score. By way of examples, the exponents are $\alpha=1.5$, $\beta=1$, $\gamma=0.5$, $\mu=1$, $\eta=0.5$.

The overall tile scores for all the tiles that are associated with a current compressed candidate frame (or with a corresponding frame group) can be thus calculated. Once the overall tile scores for all the tiles that are associated with a current compressed candidate frame are calculated, the tile scores can be pooled to provide an overall frame quality score. The frame quality score relates to the current compressed candidate frame.

There is now provided a non-limiting description of various tile size configurations which can be used as part of some examples of the presently disclosed subject matter.

According to examples of the presently disclosed subject matter, in order to increase score robustness for different image sizes, an adaptive tile dimension selection scheme can be implemented. According to examples of the presently disclosed subject matter, the tile dimension selection scheme can be configured to select a tile size that is a multiple of 16 (macroblock size). According to further examples of the presently disclosed subject matter, the tile dimension selection scheme can be configured to select a tile size that is 64×64 in size or above. The inventors have discovered that tiles which are smaller than 64×64 can cause unstable results, possibly due the small size of the resulting PSNR sub-tiles, and in case the added artifactual edges measure is implemented as part of the evaluation process, in tiles which are smaller than 64×64, it is also possible that there would be a small amount of available 16×16 edges, and this can hamper evaluation of the added artifactual edges.

The inventors also discovered that for resolutions of approximately around Full HD (1920×1080 pixels), the maximum tile size should be 128. It is possible that for larger tiles, the sensitivity of the quality measures can be diminished due to the number of pixels in the tile.

It would be appreciated that in some examples of the presently disclosed subject matter, tile size need not be square. However in other examples of the presently disclosed subject matter, square tiles are used.

In further examples of the presently disclosed subject matter, approximately 50 tiles per frame are used for evaluating each current candidate compressed frame, but still further examples of the presently disclosed subject matter are not limited to this particular tiles per frame figure.

In order to illustrate a possible frame partitioning scheme, there is now provide a non-limiting example of a computation this can be used to determine the partitioning of a video frame having a standard aspect ratio of 4:3, with at least 6 rows 8 columns of tiles:

$$TileDim = \min\left(\frac{\min(F_{width}, F_{height})}{6}, \frac{\max(F_{width}, F_{height})}{8}\right) \quad \text{Formula (29)}$$

where TileDim denotes the tile dimension and $F_{width}$, $F_{height}$ refer to the frame width and height respectively.

TileDim is then snapped to a grid of 16, and clipped as follows:

$$TileDim = \min\left\{128, \max\left[64, 16 \cdot \text{floor}\left(\frac{TileDim}{16}\right)\right]\right\} \quad \text{Formula (30)}$$

Once a quality score is calculated for each of the tiles of a given frame (each tile dimension is TileDim×TileDim), the tile scores can be pooled to provide a single frame score. The inventors discovered that calculating the scores over image tiles and then pooling the results, yields a frame quality measure that is robust to different image sizes and contents.

According to some examples of the presently disclosed subject matter, pooling the tile scores to provide an overall frame score can include:

Finding a lowest tile score (score of worst behaving tile) denoted $S_{min}$, setting a threshold for tile scores to be included in calculation for example:

$$THR_S = \min(0.95, 2.5 \cdot S_{min}) \quad \text{Formula (31)}$$

if $S_{min} \geq THR_S$, i.e., there are no scores below 0.95, the frame score is set to $S_{min}$, otherwise the score for the frame is calculated as the average between $S_{min}$ and the average of all tile scores that are below $THR_S$.

It would be appreciated that the proposed pooling procedure can be used to emphasize (or give a higher weight to) the worst tile in the current candidate compressed frame. It would also be appreciated that the worst tile is typically where the subjective viewer would be drawn to. The proposed pooling procedure can also provide for integration of the scores over the frame, while excluding high quality 'outliers', i.e., tiles with particularly high quality compared to the worst case tile.

In addition to the frame quality evaluation process described above, additional or other measures can be included in the method of controlling a compression of a video sequence and can be implemented by the device for controlling a compression of a video sequence. Such additional or other measures can be configured to operate with respect of particular frames with specific characteristics. Frames that are characterized by high frequency content that is located in very sparse backgrounds, 'titles' frame, or dark fade-in and fade-out frames are examples of frames that requires other or additional process and evaluation due to the specific characteristics of such frame.

According to examples of the presently disclosed subject matter, in such frames, due to the lack of detail, the Human Visual System (HVS) tends to focus on small areas where content is present, a behavior which can affect subjective evaluation of the candidate compressed frame's quality. According to examples of the presently disclosed subject matter, as part of the quality evaluation process, a penalty which is dependent on the extent of "variance" in sub-tile PSNR values in the frame tiles can be added to the frame quality score. Further by way of example, the penalty can be calculated as follows:

for each tile in the frame:

$$psnrMinMaxR(k, l) = \begin{cases} -1 & \text{if}(T_R = T_T) \\ \frac{\min[psnrST(i, j)]}{0.000001 + \max[psnrST(i, j)]} & \text{otherwise} \end{cases} \quad \text{Formula (32)}$$

where (k,l) are the tile indices and (i,j) are the sub-tile indices. psnrMinMaxR(k,l): denotes a ratio between the minimum and maximum sub-tile PSNR values and is required for the calculation below, psnrST(i,j)-denotes the sub-tile PSNR as defined above, $T_R$ the reference (original) tile and T-denotes the target (recompressed) tile.

Then, after calculating the overall frame score $S_F$, it can be corrected by a corresponding global correction factor, G_CF, for example, as follows:

set $R_{max}$ to max (psnrMinMaxR(k,l)); $R_{max}$ is the maximum PSNR min/max ratio in the frame.

if $R_{max}$ exceeds (−1) a score correction factor can be calculate as follows:

set $R_{avg}$ to the average of all psnrMinMaxR(k,l) values that are not equal to (−1).

$$G\_CF=0.6+0.75*R_{avg} \qquad \text{Formula (33)}$$

clip the correction factor to the range [0.65, 1].

$$S_F=G\_CF*S_F \qquad \text{Formula (34)}$$

It will also be understood that the device according to the invention can be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method of controlling a video content system based on an input video sequence and a corresponding degraded video sequence, the input video sequence including at least a current input frame and a preceding input frame, and the degraded video sequence including at least a current degraded frame and a preceding degraded frame, the method comprising:
    obtaining the current input frame, the preceding input frame, the current degraded frame and the preceding degraded frame;
    computing a first differences value from the current input and the preceding input frames and a second differences value from the current degraded frame and the preceding degraded frame;
    comparing the first and second differences values giving rise to an inter-frame quality score;
    computing an intra-frame quality score using an intra-frame quality measure that is applied in the pixel-domain of the current degraded frame and the current input frame; and
    providing a configuration instruction to the video content system based on a quality criterion related to the inter-frame and the intra-frame quality scores;
    wherein the degraded video sequence is a compressed video sequence corresponding to the input video sequence,
        providing a compression parameter value, wherein:
        said obtaining comprises, obtaining a candidate compressed frame generated from a current input frame according to the compression parameter value and for each current input frame and candidate compressed frame providing a stored compressed frame corresponding to the preceding input frame;
        wherein said computing a first differences value comprises computing a first differences value from the current input and the preceding input frames, and wherein said computing a second differences value comprises computing a second differences value from the candidate compressed frame and the stored compressed frame, and comparing the first and second differences values giving rise to an inter-frame quality score;
    wherein said computing an intra-frame quality score comprises computing an intra-frame quality using an intra-frame quality measure that is applied in the pixel-domain of the candidate compressed frame and the current input frame, and
    wherein in case a quality criterion related to inter-frame and intra-frame quality is not satisfied, instructing the video encoder to repeat a compression process using an updated compression parameter value giving rise to an updated candidate compressed frame and computing the inter-frame quality score and the intra-frame quality score based on the updated candidate compressed frame, and
    computing a frame quality score for the current candidate compressed frame based on the intra-frame and the inter-frame quality scores, and wherein the quality criterion is related to the frame quality score.

2. The method according to claim 1, further comprising:
    partitioning each of the current input frame, the preceding input frame, the candidate compressed frame and the stored compressed frame into corresponding tiles;
    calculating an intra-tile and an inter-tile quality scores for each set of corresponding tiles;
    computing perceptually driven weights for the intra-tile and the inter-tile quality scores; and
    pooling the tile scores giving rise to the frame quality score.

3. The method according to claim 2, wherein said computing an intra-frame quality score further comprises:
    partitioning a current input frame tile and a corresponding candidate compressed frame tile, giving rise to a plurality of sub-tile pairs;
    computing an intra sub-tile quality score for each one of the plurality of sub-tile pairs;
    computing a perceptually driven weight for each one of the plurality of sub-tile pairs giving rise to a plurality of weighted intra sub-tile quality scores; and
    pooling the plurality of weighted intra sub-tile quality scores into a corresponding plurality of intra-tile quality scores.

4. The method according to claim 2, wherein said computing an inter-frame quality score further comprises:
    partitioning each tile from a set of corresponding tiles consisting of a current input frame tile, a preceding frame tile, a candidate compressed frame tile and a stored compressed frame tile into two or more sub-tiles, giving rise to two or more sub-tile groups;
    computing an inter sub-tile score for each of the two or more sub-tile groups; and
    pooling the two or more inter sub-tile scores into a corresponding inter-frame tile quality score.

5. The method according to claim 1, wherein said computing an intra-frame quality score further comprises using a full-reference pixel-domain quality measure, wherein the input frame is the pixel domain reference.

6. The method according to claim 5, wherein said computing an intra-frame quality score comprises, computing an intra-frame quality score based on a pixel-wise difference between the input frame and the candidate compressed frame.

7. The method according to claim 6, wherein said computing an intra-frame quality score further comprises normalizing the intra-frame quality score based on a brightness parameter value of pixels in the compressed frame.

8. The method according to claim 1, wherein said computing an intra-frame quality score further comprises, calculating an added artifactual edges score that is based on quantifying an extent of added artifactual edges along a video coding block boundary of the candidate compressed frame relative to the current input frame, wherein the extent of added artifactual edges is determined according to a behavior of pixel values across video coding block boundaries in relation to a behavior of pixel values on either side of respective video coding block boundaries.

9. The method according to claim 8, wherein said calculating an added artifactual edges score further comprises, normalizing the added artifactual edges score according to an artifactual edges normalization factor that is based on the brightness parameter value and on a distribution of the extent of added artifactual edges.

10. The method according to claim 1, wherein said computing an intra-frame quality score further comprises, calculating a texture distortion score based on relations between texture values in the current input frame and in the corresponding candidate compressed frame, each texture value corresponding to a variance of pixel values within each one of a plurality of predefined pixel groups in the current input frame and in each respective pixel group in the corresponding candidate compressed frame.

11. The method according to claim 10, wherein said calculating a texture distortion score comprises applying one or more texture distortion sensitivity thresholds to the relations between texture values in the current input frame and in the corresponding candidate compressed frame, giving rise to a non-linear texture distortion score mapping that is based on the texture distortion sensitivity thresholds.

12. The method according to claim 11, wherein said applying one or more texture distortion sensitivity thresholds includes adapting the one or more texture distortion sensitivity thresholds according to the calculated pixel-wise differences.

13. The method according to claim 10, wherein said calculating a texture distortion score further comprises, normalizing the texture distortion score according to the brightness parameter value and according to the artifactual edges normalization factor.

14. The method according to claim 3, wherein said computing an intra-frame quality score further comprises:
  obtaining an edge map corresponding to the current input frame;
  for each edge pixel in the current input frame providing an edge strength score based on a deviation between a value of an edge pixel and one or more pixels in the proximity of the edge pixel;
  for each corresponding pixel in the candidate compressed frame providing an edge strength score based on a deviation between a value of the corresponding pixel and one or more pixels in the proximity of the corresponding pixel; and
  calculating an edge loss score based on a relation among the edge strength score of the edge pixel and the edge strength score of the corresponding pixel.

15. The method according to claim 1, wherein said computing an intra-frame quality score further comprises:
  obtaining an edge map corresponding to the current input frame;
  obtaining an edge map corresponding to the candidate compressed frame; and
  calculating an edge loss score based on a loss of edge pixels according to a difference between the edge map corresponding to the current input frame and the edge map corresponding to the candidate compressed frame.

16. The method according to claim 1, wherein said computing an intra-frame quality score further comprises factoring the intra-frame quality score based on a spatial distribution of pixel domain differences among the current input frame and the candidate compressed frame.

17. The method according to claim 16, wherein said computing an intra-frame quality score further comprises:
  for each candidate compressed frame tile, computing a tile spatial distribution score based on a distribution among the pixel difference scores of the corresponding sub-tile pairs;
  for the candidate compressed frame, pooling the tile spatial distribution scores, giving rise to a frame spatial distribution score; and
  factoring the intra-frame quality score according to the frame spatial distribution score.

18. The method according to claim 1, wherein said providing a configuration instruction comprises providing a configuration parameter that is related to a respective operation or asset of the video content system.

19. The method according to claim 1, wherein said providing a configuration instruction comprises providing an indication with regard to an extent of modification that is to be applied to the configuration of a respective operation or asset of the video content system.

20. A device for controlling a video content system based on an input video sequence and a corresponding degraded video sequence, the input video sequence including at least a current input frame and a preceding input frame, and the degraded video sequence including at least a current degraded frame and a preceding degraded frame, the device comprising:
  an interface configured to receive as input each of the current input frame, the preceding input frame, the current degraded frame and the preceding degraded frame;
  a processor configured to compute a first differences value from the current input frame and the preceding input frame, and a second differences value from the current degraded frame and the preceding degraded frame;
  a quality degradation evaluation module adapted to compare the first and the second differences values, giving rise to an inter-frame quality score; and
  said quality degradation evaluation module is adapted to compute an intra-frame quality score using an intra-frame quality measure that is applied in the pixel-domain of the current input frame and the current degraded frame; and
  a video content system configurator, configured to provide a configuration instruction to the video content system based on a quality criterion related to the inter-frame and the intra-frame quality scores;
  wherein the degraded video sequence is a compressed video sequence corresponding to the input video sequence, and said device comprises:
  a buffer adapted to hold a preceding input frame and a preceding compressed frame corresponding to the preceding input frame; and
  wherein:
  said video content system configurator is adapted to instruct a video encoder to compress the current input frame according to a compression parameter value, giving rise to a candidate compressed frame;
  said interface is adapted to receive the current input frame and the candidate compressed frame, said processor is configured to compute a first differences value from the current input frame and preceding input frame, and a second differences value from the candidate compressed frame and the preceding compressed frame, said quality degradation evaluation module is adapted to compute an intra-frame quality score using an intra-frame quality measure that is applied in the pixel-domain for the candidate compressed frame and the current input frame; and said quality degradation evaluation module is adapted to compare the first and second differences values giving rise to an inter-frame quality score, wherein in case a quality criterion related to inter-frame and intra-frame quality scores is not satisfied, said a video content system configurator is adapted to instruct the video encoder to repeat the video compression of the current input frame using an updated compression parameter value, giving rise to an updated candidate compressed frame and computing the inter-frame quality score and the intra-frame quality score based on the updated candidate compressed frame, and wherein the processor is further configured to compute a frame quality score for the current input frame based on the intra-frame and the inter-frame quality scores, and wherein the quality criterion is related to the frame quality score.

21. The device according to claim 20, further comprising a frame partitioning module adapted to partition each of the current input frame, the preceding input frame, the candidate compressed frame and the stored compressed frame into two or more tiles, and wherein said processor is adapted to:
calculate an intra-tile and an inter-frame quality score for each set of corresponding tiles;
compute perceptually driven weights for the intra-tile and the inter-tile quality scores; and
pool tile scores, giving rise to the frame quality score.

22. The device according to claim 21, further comprising a partitioning module that is adapted to partition a current input frame tile and a corresponding candidate compressed frame tile, giving rise to a plurality of sub-tile pairs, and
wherein said quality degradation evaluation module is adapted to:
compute an intra sub-tile quality score for each one of the plurality of sub-tile pairs;
compute a perceptually driven weight for each one of the plurality of sub-tile pairs giving rise to a plurality of weighted intra sub-tile quality scores; and
pool the plurality of weighted intra sub-tile quality scores into a corresponding plurality of intra-tile quality scores.

23. The device according to claim 21, further comprising a partitioning module that is adapted to partition each tile from a set of corresponding tiles consisting of: a current input frame tile, a preceding input frame tile, a candidate compressed frame tile and a stored compressed frame tile into two or more sub-tiles, giving rise to two or more sub-tile sets, and
wherein, said quality degradation evaluation module is adapted to:
compute an inter sub-tile score for each of the two or more sub-tile sets; and
pool the two or more inter sub-tile scores into a corresponding inter-frame tile quality score.

24. The device according to claim 20, wherein said quality degradation evaluation module is adapted to use a full-reference pixel-domain quality measure to compute the intra-frame quality score, wherein the input frame is a pixel domain reference.

25. The device according to claim 24, wherein said quality degradation evaluation module is adapted to compute the intra-frame quality score based on a pixel-wise difference between the input frame and the candidate compressed frame.

26. The device according to claim 25, wherein said quality degradation evaluation module is adapted to normalize the intra-frame quality score based on a brightness parameter value of pixels in the compressed frame.

27. The device according to claim 20, wherein said quality degradation evaluation module is adapted to calculate an added artifactual edges score that is based on quantifying an extent of added artifactual edges along a video encoding coding block boundary of the candidate compressed frame relative to the current input frame, wherein the extent of added artifactual edges is determined according to a behavior of pixel values across video coding block boundaries in relation to a behavior of pixel values on either side of respective video coding block boundaries, and wherein the intra-frame quality score is associated with the calculated added artifactual edges score.

28. The device according to claim 27, wherein said quality degradation evaluation module is adapted to normalize the added artifactual edges score according to an artifactual edges normalization factor that is based on the brightness parameter value and on a distribution of the extent of added artifactual edges.

29. The device according to claim 20, wherein said quality degradation evaluation module is adapted to compute a texture distortion score based on relations between texture values in the current input frame and in the corresponding candidate compressed frame, each texture value corresponding to a variance of pixel values within each one of a plurality of predefined pixel groups in the current input frame and in each respective pixel group in the corresponding candidate compressed frame, and wherein the intra-frame quality score is associated with the calculated texture distortion score.

30. The device according to claim 29, wherein said quality degradation evaluation module is adapted to apply one or more texture distortion sensitivity thresholds to the relations between texture values in the current input frame and in the corresponding candidate compressed frame, giving rise to a non-linear texture distortion score mapping that is based on the texture distortion sensitivity thresholds, and wherein said texture distortion score is associated with the non-linear texture distortion score mapping.

31. The device according to claim 30, wherein said quality degradation evaluation module is adapted to adapt the one or more texture distortion sensitivity thresholds according to the calculated pixel-wise differences.

32. The device according to claim 29, wherein said quality degradation evaluation module is adapted to normalize the texture distortion score according to the brightness parameter value and according to the artifactual edges normalization factor.

33. The device according to claim 20, wherein said quality degradation evaluation module is adapted to:
obtain an edge map corresponding to the current input frame;
obtain an edge map corresponding to the candidate compressed frame; and
calculate an edge loss score based on a loss of edge pixels according to a difference between the edge map corresponding to the current input frame and the edge map corresponding to the candidate compressed frame.

34. The device according to claim 20, wherein said quality degradation evaluation module is adapted to factor the intra-frame quality score based on a spatial distribution of pixel domain differences among the current input frame and the candidate compressed frame.

35. The device according to claim 20, wherein said quality degradation evaluation module is adapted to:
compute a tile spatial distribution score for each candidate compressed frame tile based on a distribution among the pixel difference scores of the corresponding sub-tile pairs; and
pool the tile spatial distribution scores for the candidate compressed frame, giving rise to a frame spatial distribution score; and
factoring the intra-frame quality score according to the frame spatial distribution score.

36. The device according to claim 20, wherein said video content system configurator is adapted to provide a configuration instruction which includes a configuration parameter that is related to a respective operation or asset of the video content system.

37. The device according to claim 20, wherein the configuration instruction indicates an extent of modification that is to be applied to the configuration of a respective operation or asset of the video content system.

38. A program storage device readable by machine, tangibly embodying a program of instructions executable by the machine to perform a method of controlling a compression of a video frame from a video sequence to compress a video frame from an input video sequence, the sequence comprising at least a current input frame and a preceding frame, the method comprising:
providing a compression parameter value;
obtaining a candidate compressed frame generated from a current input frame according to the compression parameter value;
for each current input frame and candidate compressed frame providing a stored compressed frame corresponding to the preceding input frame;
computing a first differences value from the current input and the preceding input frames and a second differences value from the candidate compressed frame and the stored compressed frame;
comparing the first and second differences value giving rise to an inter-frame quality score;
computing an intra-frame quality score using an intra-frame quality measure that is applied in the pixel-domain of the candidate compressed frame and the current input frame; and
in case a quality criterion related to inter-frame and intra-frame quality is not satisfied, instructing the video encoder to repeat a compression process using an updated compression parameter value giving rise to an updated candidate compressed frame and computing the inter-frame quality score and the intra-frame quality score based on the updated candidate compressed frame, wherein the degraded video sequence is a compressed video sequence corresponding to the input video sequence,
wherein said computing a first differences value comprises computing a first differences value from the current input and the preceding input frames, and
wherein said computing a second differences value comprises computing a second differences value from the candidate compressed frame and the stored compressed frame, and comparing the first and second differences values giving rise to an inter-frame quality score;
the method further comprising computing a frame quality score for the current candidate compressed frame based on the intra-frame and the inter-frame quality scores, and wherein the quality criterion is related to the frame quality score.

39. A computer program product comprising a non-transitory computer useable medium having computer readable program code embodied therein for controlling a compression of a video frame from a video sequence to compress a video frame from an input video sequence, the sequence comprising at least a current input frame and a preceding frame, the computer program product comprising:
computer readable program code for causing the computer to provide a compression parameter value;
computer readable program code for causing the computer to obtain a candidate compressed frame generated from a current input frame according to the compression parameter value;
computer readable program code for causing the computer to for each current input frame and candidate compressed frame providing a stored compressed frame corresponding to the preceding input frame;
computer readable program code for causing the computer to compute a first differences value from the current input and the preceding input frames and a second differences value from the candidate compressed frame and the stored compressed frame;
computer readable program code for causing the computer to compare the first and second differences value giving rise to an inter-frame quality score;
computer readable program code for causing the computer to compute an intra-frame quality score using an intra-frame quality measure that is applied in the pixel-domain of the candidate compressed frame and the current input frame; and
computer readable program code for causing the computer to in case a quality criterion related to inter-frame and intra-frame quality is not satisfied, instructing the video encoder to repeat a compression process using an updated compression parameter value giving rise to an updated candidate compressed frame and computing the inter-frame quality score and the intra-frame quality score based on the updated candidate compressed frame, wherein the degraded video sequence is a compressed video sequence corresponding to the input video sequence,
wherein the computer readable code for computing a first differences value comprises computer readable code for computing a first differences value from the current input and the preceding input frames, and
wherein the computer readable code for computing a second differences value comprises computer readable code for computing a second differences value from the candidate compressed frame and the stored compressed frame, and comparing the first and second differences values giving rise to an inter-frame quality score;
and further comprising computer readable code for computing a frame quality score for the current candidate compressed frame based on the intra-frame and the inter-frame quality scores, and wherein the quality criterion is related to the frame quality score.

* * * * *